(12) United States Patent
Jochai

(10) Patent No.: US 11,934,234 B2
(45) Date of Patent: Mar. 19, 2024

(54) COMPUTER CHASSIS

(71) Applicant: Craft O Graph LLC, Portland, OR (US)

(72) Inventor: Kyle Jochai, Portland, OR (US)

(73) Assignee: Craft O Graph LLC, Portland, OR (US)

( * ) Notice: Subject to any disclaimer, the term of this patent is extended or adjusted under 35 U.S.C. 154(b) by 0 days.

(21) Appl. No.: 17/714,658

(22) Filed: Apr. 6, 2022

(65) Prior Publication Data

US 2023/0221778 A1    Jul. 13, 2023

Related U.S. Application Data

(60) Provisional application No. 63/298,053, filed on Jan. 10, 2022.

(51) Int. Cl.
    *G06F 1/18*      (2006.01)

(52) U.S. Cl.
    CPC .............. *G06F 1/183* (2013.01); *G06F 1/181* (2013.01)

(58) Field of Classification Search
    CPC ................................. G06F 1/183; G06F 1/181
    See application file for complete search history.

(56) References Cited

U.S. PATENT DOCUMENTS

| | | | |
|---|---|---|---|
| 5,973,916 A | 10/1999 | Han | |
| 6,157,423 A | 12/2000 | Stonebraker et al. | |
| 6,366,453 B1 | 4/2002 | Wang et al. | |
| 6,560,094 B2 | 5/2003 | Schmidt | |
| 7,159,053 B1 | 1/2007 | Lakin | |
| 7,499,272 B2 | 3/2009 | Searby et al. | |
| 7,502,226 B2 | 3/2009 | Searby et al. | |
| 7,719,832 B2 | 5/2010 | Kobara et al. | |

(Continued)

FOREIGN PATENT DOCUMENTS

EP      1244000 A2      9/2002

OTHER PUBLICATIONS

BHB Mods, "The iPredator Power, Custom-Loop-All-In-One-Gaming-PC" Digital contest entry dated Oct. 23, 2020, https://builds.gg/bhbmods/the-ipredator-powder-custom-loop-all-in-one-gaming-pc-16861 Cite No. D001.

(Continued)

*Primary Examiner* — Rockshana D Chowdhury
(74) *Attorney, Agent, or Firm* — Kolitch Romano Dascenzo Gates LLC

(57) ABSTRACT

A computer chassis includes a mounting hub configured to be coupled between a display device and a computer support structure and a chassis frame configured to be removably received by the mounting hub. In some examples, the chassis frame comprises a central bracket and a pair of frame arms extending from the central bracket. Each frame arm may be configured to support one or more computer components in a customizable arrangement. The central bracket may include a channel configured to receive a cable connecting a computer component attached to a first one of the frame arms to a computer component attached to a second one of the frame arms. At least a portion of the cable management channel may be disposed between the portions of the mounting hub configured to couple to the display device and computer support structure respectively.

16 Claims, 25 Drawing Sheets

(56) References Cited

U.S. PATENT DOCUMENTS

| | | |
|---|---|---|
| 7,845,608 B1 | 12/2010 | Chen et al. |
| 8,047,489 B2 * | 11/2011 | Watanabe ................ H04N 5/64 |
| | | 248/274.1 |
| 8,599,552 B2 | 12/2013 | Lee et al. |
| 9,710,027 B2 | 7/2017 | Sniffen |
| 10,126,787 B1 | 11/2018 | Aldridge et al. |
| 10,473,259 B1 | 11/2019 | Chen et al. |
| 10,533,699 B2 * | 1/2020 | Yang .................... H04B 1/3877 |
| 10,774,982 B2 | 9/2020 | Sung |
| 10,980,339 B2 * | 4/2021 | Game .................... A47B 21/04 |
| 11,178,969 B2 * | 11/2021 | Keith, Jr. ............... G06F 1/1607 |
| 11,371,644 B2 * | 6/2022 | Leclerc ................. F16M 11/08 |
| 11,421,814 B2 * | 8/2022 | Affentranger .......... A47B 23/04 |
| 2003/0063059 A1 | 4/2003 | Farrow et al. |
| 2007/0168593 A1 | 7/2007 | Montag et al. |
| 2010/0188812 A1 | 7/2010 | Morrison et al. |
| 2010/0321876 A1 | 12/2010 | Liu et al. |
| 2011/0157805 A1 | 6/2011 | Mi et al. |
| 2011/0216495 A1 | 9/2011 | Marx |
| 2012/0120581 A1 | 5/2012 | Haren |
| 2013/0010418 A1 | 1/2013 | Flynn et al. |
| 2013/0222996 A1 | 8/2013 | Stokman |
| 2014/0321039 A1 | 10/2014 | Quijano et al. |
| 2019/0141848 A1 | 5/2019 | Sung |
| 2020/0315042 A1 | 10/2020 | Bullock et al. |
| 2021/0033243 A1 * | 2/2021 | Gold ................... F16M 11/2014 |
| 2022/0107669 A1 * | 4/2022 | Emam .................. G06F 1/1656 |
| 2022/0253096 A1 * | 8/2022 | Stone ................... G06F 1/1626 |
| 2022/0408931 A1 * | 12/2022 | Pavlov ................. G06F 1/1601 |

OTHER PUBLICATIONS

Quiet PC, "Quiet PC mono All-In-One Desktop PC", Digital product description accessed on Jul. 7, 2022, https://www.quietpc.com/sys-mono-aio Cite No. D002.

\* cited by examiner

COMPUTER CHASSIS

CROSS-REFERENCES

The following applications and materials are incorporated herein, in their entireties, for all purposes: U.S. Provisional Patent Application 63/298,053, filed Jan. 10, 2022.

FIELD

This disclosure relates to systems and methods for computer chassis. More specifically, the disclosed embodiments relate to a computer chassis configured to hold an easily customizable arrangement of computer components, facilitating concealment of the components behind a computer monitor.

INTRODUCTION

In general, conventional all-in-one computers include a display device and computing component(s) (e.g., motherboard, processor, memory device, and/or the like) arranged in a single housing. The all-in-one computer has the advantages of being rather straightforward to set up for use and reducing cable clutter on or around a desk or display (e.g., because many or all of the computer components and the connections between them are contained within in the housing). Because all-in-one computers generally come with a predetermined assortment of components and provide little or no space for user customization, the housing may be designed to fit only the predetermined components and wiring. While these housings of all-in-one computers effectively fit the designated hardware and wiring, they are also relatively difficult to take apart and/or open up to facilitate servicing and/or replacing of the components held within.

Additionally, the manufacturing of all-in-one computer housings can be costly due to the need for forming specific shapes and channels specifically configured to effectively house specific components in an efficiently sized structure. Because the housing is manufactured to efficiently fit only the designated computer components and wires, the recesses, protrusions and/or other fastenings of the housing formed by the manufacturing process may not be compatible with a component chosen after the manufacturing process (e.g., to supplement and/or replace one or more of the pre-installed components). Accordingly, before manufacturing begins, the functionality of the all-in-one computer and thus all its computer components and properties such as processing power, memory storage, etc. must be decided on, so as to determine the exact shape and size of components that the housing will be manufactured to hold. Furthermore, due to the difficulty of replacing the components or adding new ones, it is difficult or impossible to change or upgrade the computer's functionality later. This can be particularly disadvantageous for professions and hobbies that heavily depend on computing power, such as gaming, media creation, and video production, for which individuals often need more or different computing components than what is arranged inside most all-in-one computers. Individuals who find themselves in these situations often resort to either building their own desktop unit or placing the necessary hardware on a desk and plugging it in to their all-in-one computer (e.g., to external ports of the computer). These options complicate the selection and setup of the computer and increase clutter on or around a desk or display, and thus tend to cancel out the typical advantages of selecting an all-in-one device in the first place.

SUMMARY

The present disclosure provides systems, apparatuses, and methods relating to a computer chassis.

In some embodiments, a chassis for a computer may comprise a chassis frame including a medial panel and first and second lateral frame portions extending from the medial panel, the first and second lateral frame portions each configured to support one or more computing components; and a mounting hub having a first side configured to couple to a support structure and a second side configured to couple to a display device, and an opening configured to receive a lower portion of the medial panel of the chassis frame.

In some embodiments, a chassis for supporting computer components behind a display device may comprise a frame including a central bracket comprising a pair of panels spaced from each other by a gap, and a pair of support arms each configured to couple to one or more computer components, wherein each of the support arms has a first end sandwiched between the panels; and a mounting hub configured to couple to a display device, the mounting hub including a recess configured to receive at least a portion of the central bracket such that at least a portion of the gap is disposed within the recess.

In some embodiments, a method of assembling a computer chassis may comprise disposing an electrical connector in a passage of a chassis frame panel, such that first and second ends of the electrical connector extend from respective first and second sides of the chassis frame panel; coupling a first end of a first frame arm to the chassis frame panel; coupling a first end of a second frame arm to the chassis frame panel; attaching a first computer component to the first frame arm and a second computer component to the second frame arm; connecting the first end of the electrical connector to the first computer component and connecting the second end of the electrical connector to the second computer component; and inserting the chassis frame panel into a recess of a mounting adapter.

Features, functions, and advantages may be achieved independently in various embodiments of the present disclosure, or may be combined in yet other embodiments, further details of which can be seen with reference to the following description and drawings.

DETAILED DESCRIPTION

Figure 1:
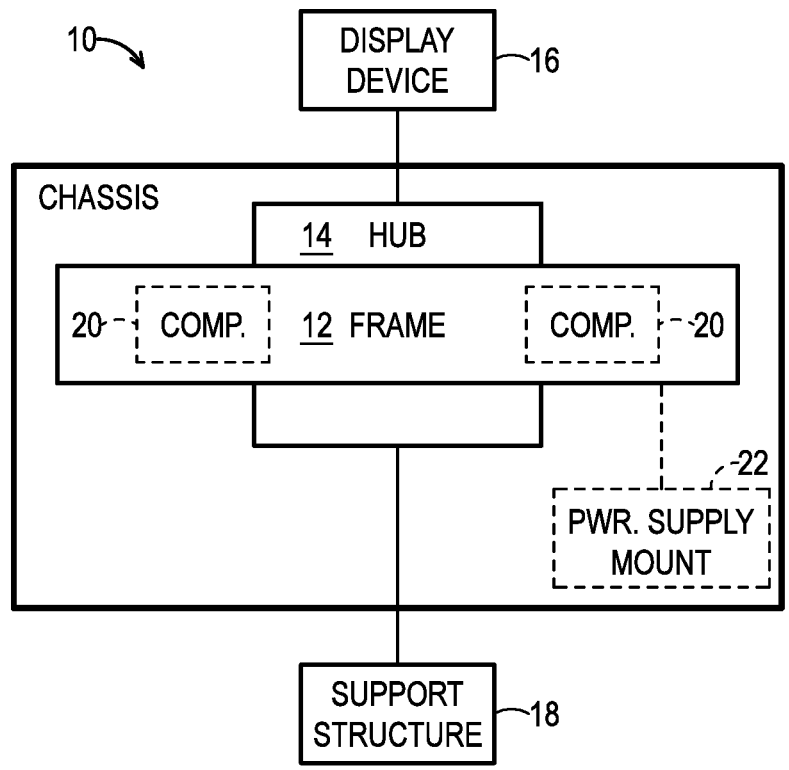
FIG. 1 is a schematic diagram of an illustrative computer chassis coupled to a display device and a support structure in accordance with aspects of the present teachings.

Various aspects and examples of a computer chassis, as well as related methods, are described below and illustrated in the associated drawings. Unless otherwise specified, a computer chassis in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a computer chassis in accordance with the present teachings includes a chassis frame configured to support one or more computer hardware components, and a mounting hub (AKA a mounting adapter) configured to couple the chassis frame to a display device (e.g., a computer monitor) such that the frame and attached computer hardware components are concealed behind the display device. The mounting hub is further configured to couple to a support structure (e.g., a support stand, armature, wall mount, and/or any other suitable device) suitable for supporting the mounting hub, chassis frame, and display device.

Coupling the chassis frame to the mounting hub and coupling the mounting hub to the display device (e.g., to an interface area of the display device) allows the chassis frame to be disposed behind the display device.

In some examples, the mounting hub includes a mounting interface configured to attach to a standard Video Electronics Standards Association (VESA) interface area disposed on the back of a typical display device. The VESA-compatible mounting interface may be disposed on, and/or may comprise, a front surface of the mounting hub. A back surface of the mounting hub may include a VESA-compatible interface configured to connect the mounting hub to a VESA-compatible support structure.

In some examples, the mounting hub includes a mounting protrusion configured to interface with a bottom portion of the chassis frame. The mounting protrusion is disposed within a recess, passage, and/or opening formed in and/or through the mounting hub. This allows the chassis frame to be mounted at various heights relative to the interface area. In some examples, the protrusion is be disposed at a relatively low height in the mounting hub, thereby facilitating placement of the chassis frame relatively low in the hub. For example, lower edge(s) of the chassis frame may be disposed at substantially the same vertical height as a lower edge of the interface area. Depending on the size of the display device, this arrangement may allow the chassis frame, when coupled to the mounting hub, to be disposed low enough to conceal most or all of the frame from view behind the display device. Concealing the frame and attached components in a hidden space behind the display device is aesthetically pleasing and can reduce the likelihood that the frame and components will be inadvertently jostled. As used herein, the term "hidden space" refers to the space behind a display device that is generally not visible to a user when viewed from the front of the display device (e.g., from the position of a typical user using the computer). The chassis frame, when mounted in the hub, provides a location in the hidden space for attaching hardware components, item storage, peripherals, cables, cooling and/or accessory mounting devices, and/or any other suitable devices.

In some examples, to accommodate display devices of various sizes, the mounting hub is configured to allow the mounting protrusion to be selectively disposed at different heights within the mounting hub (e.g., the height being adjustable before and/or after coupling the mounting hub to the display device).

In some examples, the chassis frame is configured to couple to the hub in such a manner that the chassis frame is easily removable from the hub. The removable coupling of the chassis frame to the hub facilitates the repair and/or replacement of installed hardware components, and may make it easier to detach the hub from the display and/or support and attach it to a new display and/or support. Removing the chassis frame from the mounting hub requires no disassembly of the display device or support structure. Accordingly, the chassis of the present disclosure provides an opportunity to use the typically underutilized space behind a display device (e.g., the hidden space) to attach a variety of hardware components and/or other items, while also facilitating convenient servicing and improvement of the hardware installed on the chassis frame. However, depending on the particular computer components in question, and/or the particular mechanism(s) attaching the components to the frame, it may also be convenient to install and/or remove at least some components from the frame while the frame is disposed in the mounting hub.

In some examples, the chassis frame includes one or more armatures configured for secure attachment of mounted hardware components, and a frame bracket configured for coupling the armatures together and interfacing with the mounting hub. The armatures each include one or more mounting features (e.g., protrusions, apertures, etc.) that allow for a variety of hardware components to be attached at selected positions and orientations based on, e.g., computing, video, audio processing and/or other electronics needs and/or on the size of the display device to be used. In some examples, the armatures include, or are configured to attach to, one or more equipment mounts configured to assist in the coupling of hardware components or other suitable items to the chassis frame. Examples of equipment mounts may include hooks, shelves, cases, and/or any other suitable devices configured to be coupled to the frame and to support computer component(s) or associated items, thereby indirectly attaching the component(s) or other items to the frame. This allows hardware components as well as other suitable items to either be directly secured to the armatures using the plurality of mounting features, or to be indirectly secured to the armatures using equipment mounts. In some examples, the frame bracket is configured for secure attachment of mounted hardware components and/or other items as well.

In some examples, the frame bracket is centrally located on the chassis frame (e.g., relative to the armature(s)). In some examples, the frame bracket includes two parallel panels and the frame bracket is configured to sandwich coupling portions of the one or more armatures between the parallel panels. Optionally, the frame bracket may include a handle portion attached to and/or formed in a top portion of the frame bracket to facilitate user manipulation of the frame (e.g., for installation and removal of the frame from the mounting hub). A bottom portion of the frame bracket may include a receiving portion configured to interface with the mounting hub.

In some examples, the chassis frame includes a cable management channel through which cables may be fed to couple components together. For example, the cable management channel may be configured to receive a cable connecting a component on a first armature to a component on a second armature. In this case, the cable management channel is disposed within the frame bracket. For example, the channel may comprise a space formed between the two parallel panels, which are spaced from each other by the coupling portions of the armatures. In this manner, the channel protects cables, wires, and/or other suitable connectors routed through the channel from wear or damage that may occur, e.g., during installation, maintenance, and use. The channel further provides organization to the computer chassis by organizing cable clutter behind the display device. By facilitating connection of component(s) on one side of the frame to component(s) on the other side of the frame (e.g., across a vertical centerline of the frame), the channel provides flexibility in the placement of the components. This flexibility enables a range of components, including components that are relatively large in size, to be connected to each other as needed or desired while still being hidden behind the display. In contrast, the lack of flexibility of component placement in conventional systems makes it difficult or impossible to place certain components (e.g., motherboard, graphical processing unit (GPU), and/or other suitable components) in a manner that facilitates connection to other components and concealment behind the display.

In some examples, at least a portion of the cable management channel is configured to be disposed between the portion of the mounting hub configured to couple to the display device and the portion of the mounting hub configured to couple to the computer support structure. Put another way, at least a portion of the channel is disposed at a same vertical height as the portions of the mounting hub configured to couple to the computer support structure and display device. This facilitates placement of a cable (and therefore placement of the computer components attached to the cable) at a lower vertical height relative to the display device than is possible with known systems.

The cable management channel may have any suitable shape. In some examples, the channel is defined between parallel panels of the frame bracket. In some examples, the channel comprises a groove formed in an exterior surface of the frame bracket (or other suitable portion of the frame). In general, the channel may take any suitable form(s), and the frame bracket may include any suitable number of channels. The channel may be configured to receive any suitable number of cables; the number of cables that may be received by a channel in any given example many depend on, e.g., the form and/or size of the channel, the dimension(s) of the cables in question, and/or any other suitable factors.

In some examples, the chassis further includes a power supply mount coupled to the chassis frame. The power supply mount is configured to securely mount at least one power supply unit (PSU), AKA a power supply, to the chassis frame. The power supply mount is configured to be tailored to attach PSUs of various sizes to the chassis frame. The power supply mount may be coupled to the chassis frame at any location configured to receive components of the power supply mount. In some examples, the power supply mount is coupled to a bottom portion of the chassis frame to take advantage of hidden space behind the display device. In some examples, the power supply mount is removably coupled to the chassis frame.

The flexibility in placement of components on the chassis allows the chassis to be utilized for a range of display device sizes, support structures, and electronics or computing components. For example, a small power supply may be mounted to the chassis frame when a small display device is used, and the same frame may be used to mount a larger power supply when a larger display device is used. The chassis frame may additionally or alternatively include adjustable equipment mounts for use in mounting other components that tend to scale in size according to performance (e.g., GPUs, cooling attachments and systems, hard drives etc.). Depending on the dimensions of the display device and the hardware components to be used, a user may find that mounting hardware components either horizontally or vertically is more advantageous and better utilizes the hidden space behind a display device.

In some examples, the chassis frame includes computing device Input/Output devices (e.g., switches, dial, connector ports, etc.) configured to be coupled to one or more hardware components (e.g., by cables and/or any other suitable connections) to provide data and/or control signals to the hardware components. The Input/Output devices may be situated along the perimeter of a chassis frame so as to be easily accessible from the front and/or sides of the display device. This arrangement allows the Input/Output devices themselves to be accessible even if the hardware components controllable by such devices are situated in a part of the chassis that is more difficult for a user to reach or see.

Examples, Components, and Alternatives

The following sections describe selected aspects of illustrative computer chassis as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Computer Chassis

Figure 2:
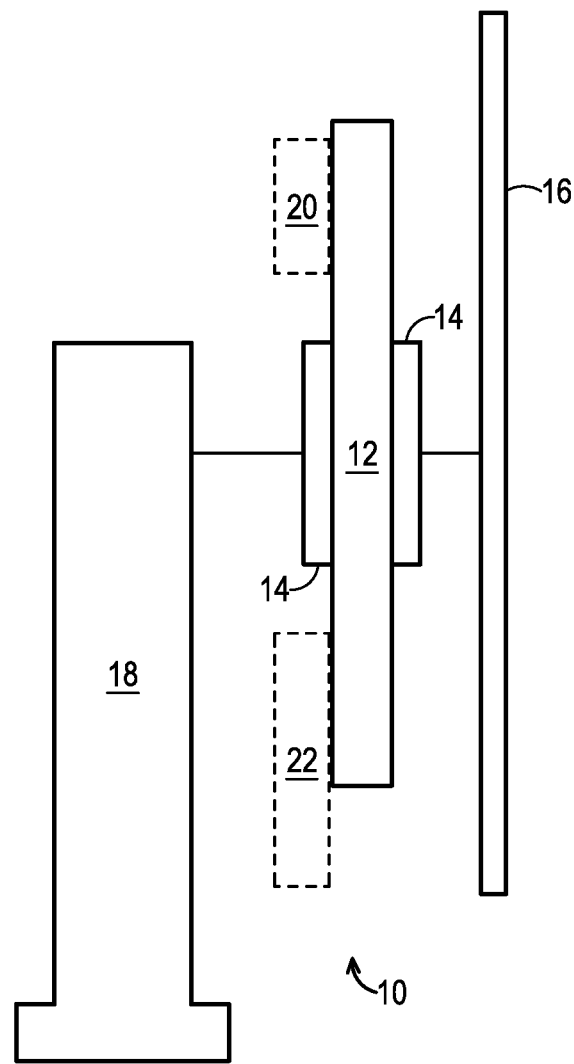
FIG. 2 is a schematic side view of the computer chassis of FIG. 1.

As shown in FIGS. 1-2, this section describes an illustrative computer chassis 10, which is an example of the computer chassis described above. FIG. 1 is a schematic diagram of chassis 10, and FIG. 2 is a schematic side view of chassis 10.

Chassis 10 includes a chassis frame 12 and a mounting hub 14. Mounting hub 14 is configured to couple to a support structure 18 and to a display device 16. For example, the hub may include a first mounting interface having a mounting pattern configured to couple to a VESA pattern or other suitable mounting pattern of a display device, and a second mounting interface having a mounting pattern configured to couple to a VESA pattern or other suitable mounting pattern of a support structure. A mounting interface may include one or more mounting apertures, tabs, screws, bolts, and/or any other suitable fastener(s).

Chassis frame 12 may comprise any suitable structure configured to support one or more hardware components 20 attached to the frame. A lower portion of chassis frame 12 is configured to couple to mounting hub 14, such that when coupled to the mounting hub, chassis frame 12 is concealed from view behind display device 16. In this manner, frame 12 provides a location in the hidden space behind display device 16 for an arrangement of hardware components 20. Example hardware components include, without limitation, a processing unit, item storage, peripherals, cables, cooling and/or accessory mounting arrangements, and/or any other suitable devices. Chassis frame 12 may be any shape and size suitable for supporting the hardware components and being concealed behind display device 16. Chassis frame 12 may comprise lightweight durable material(s) such as aluminum, titanium, steel, reinforced nylon, polycarbonate, wood, etc., and/or any other suitable material(s).

In some examples, chassis frame 12 is configured to allow the attachment and/or rearrangement of hardware components 20 in a variety of locations, positions, and/or orientations on the chassis frame. This flexible feature of frame 12 allows a single chassis to be utilized for a range of display device sizes, support structures, and hardware components (e.g., a small power supply may be mounted to the chassis frame when a small display device is used, and the same frame may be used to mount a larger power supply when a larger display device is used). For example, chassis frame 12 may include a plurality of protrusions and/or apertures that allow for a variety of different orientations of hardware components and/or equipment mounts (e.g., shelves, brackets, housings, and/or other suitable devices configured to assist in the coupling of hardware components or other suitable items to the chassis frame). This allows the components to be attached to the frame in positions and/or orientations selected based on a range of computing, video, audio processing and/or other electronics requirements and display device sizes. In some examples, chassis frame 12 includes a power supply mount 22 configured to couple power supplies of a range of sizes to the chassis frame.

Mounting hub 14 may comprise any suitable structure(s) configured to couple the chassis frame to the support structure and the display device. In some examples, the mounting hub is configured such that the chassis frame couples directly to the mounting hub and only indirectly to the support and display device via the mounting hub. For example, mounting hub 14 may include a first interface configured to couple to the support structure, a second interface configured to couple to the display device, and a recess configured to receive a portion of the chassis frame to couple the frame to the hub. In some examples, a mounting protrusion or other suitable structure configured to engage the portion of the frame is disposed within and/or adjacent the recess such that the frame sits on the protrusion when disposed in the recess. The mounting protrusion may be any shape or size suitable to engage the lower portion of frame. Alternatively, or additionally, the frame and hub may be configured to couple together without a supporting protrusion (e.g., via fasteners and/or any other suitable mechanism(s)).

In some examples, chassis frame 12 is configured to couple to hub 14 in such a manner that the chassis frame is easily removable from the hub. For example, the frame may be configured to sit on the supportive protrusion of the mounting hub and to engage sides of the recess of the mounting hub in a friction fit, such that the frame can be inserted into and withdrawn from the hub relatively easily (e.g., with no threaded fasteners or the like to unfasten). The removable coupling of chassis frame 12 to hub 14 facilitates the repair and/or replacement of installed hardware components 20, and the removal of chassis frame 12 from hub 14 requires no disassembly of display device 16, support structure 18, or any other component.

B. Second Illustrative Computer Chassis

As shown in FIGS. 3-14, this section describes a second illustrative computer chassis 100, which is another example of the computer chassis described above.

Figure 3:
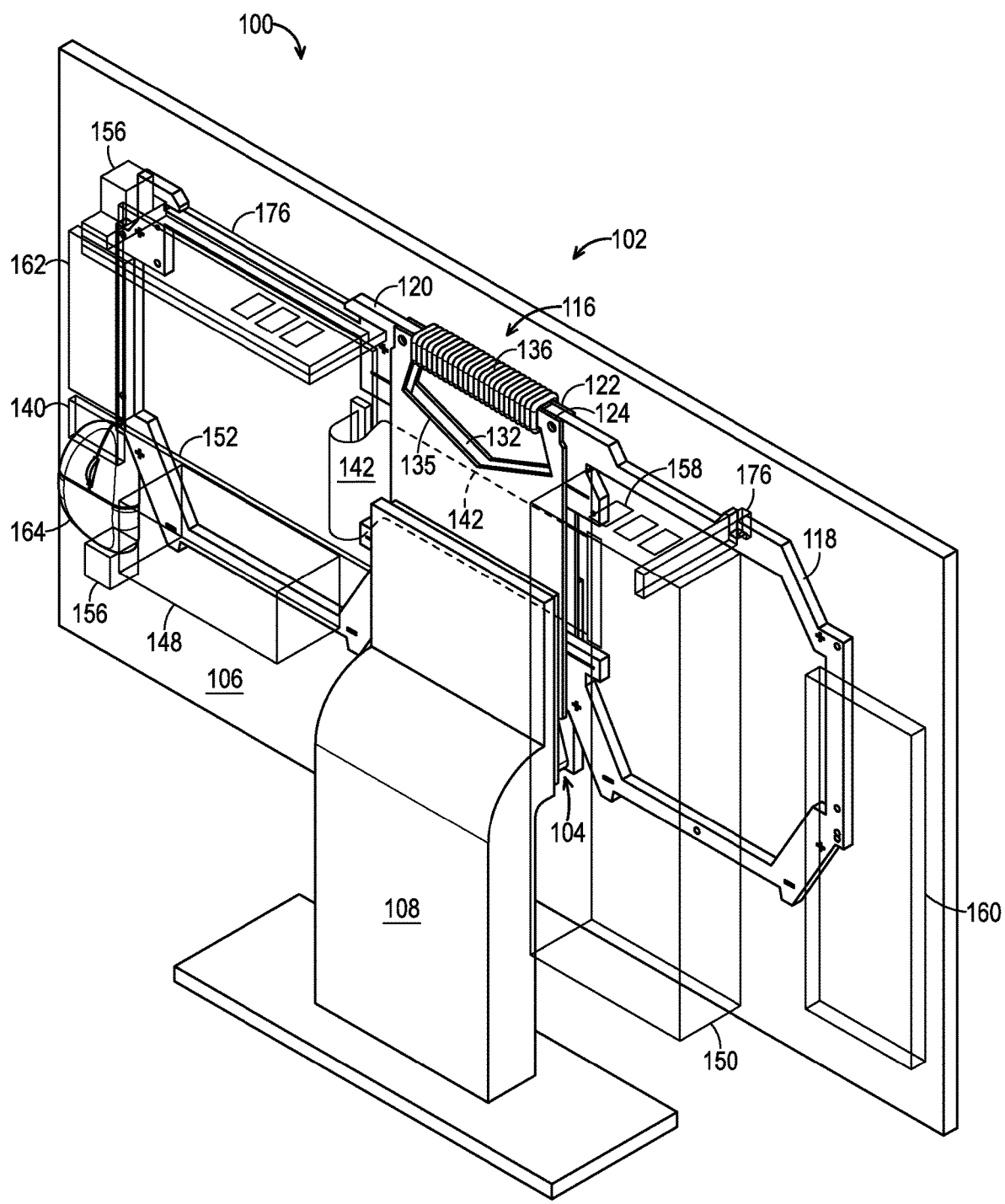
FIG. 3 is an isometric view of an illustrative computer chassis disposed between a display device and support structure in accordance with aspects of the present teachings.
Figure 4:
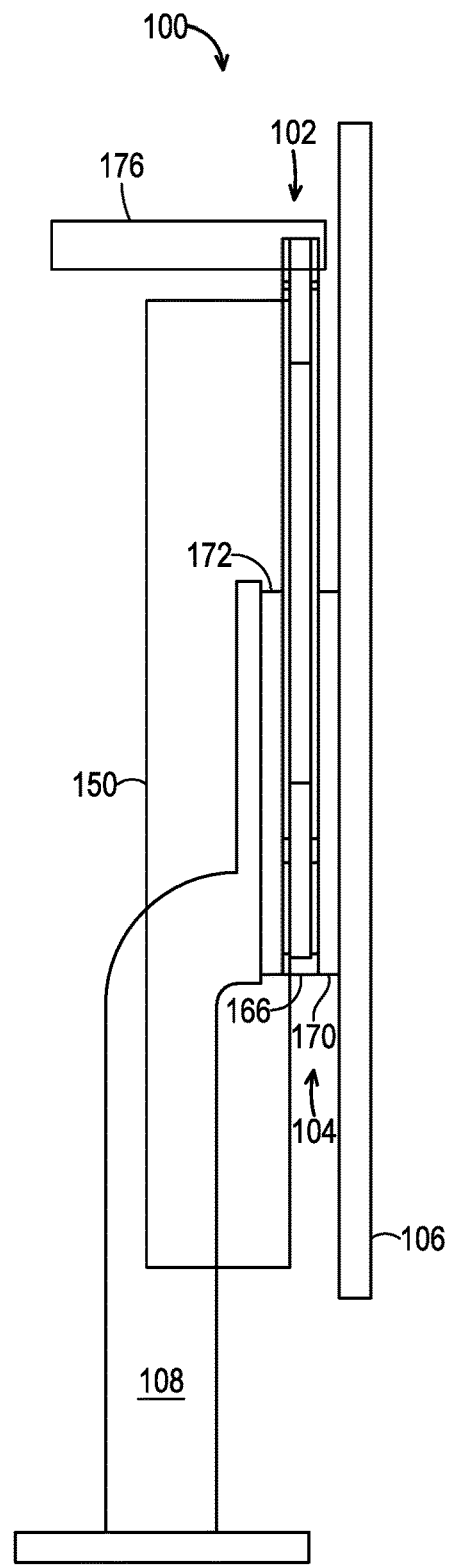
FIG. 4 is a side view of the computer chassis of FIG. 3.

FIG. 3 is an isometric back view of computer chassis 100 coupled to a display device 106. FIG. 4 is a side view of the computer chassis and display device of FIG. 3. Computer chassis 100 includes a chassis frame 102 and a mounting hub 104. Mounting hub 104 is configured to be disposed between and coupled to display device 106 and a support structure 108. Hub 104 is further configured to interface with a receiving portion 138 of chassis frame 102 (see, e.g., FIG. 10) when the frame is coupled to the hub, such that when coupled to the hub, frame 102 is concealed from view in the hidden space behind display device 106. When frame 102 is coupled to hub 104, a rear side of display device 106 provides cover for a front side of chassis 100 (i.e., the side that is immediately adjacent to the display device). As described below, a back side of frame 102 is configured to support one or more mounted hardware components. Illustrative hardware components such as a motherboard 152, a GPU 150, and a power supply 148 are depicted as transparent in the drawings to facilitate a clear view of the chassis.

Frame 102 in this example includes a left armature 118 and a right armature 120 (e.g., left and right from the point of view of a user seated at the computer) coupled to a frame bracket 116. Bracket 116 includes a front panel 122 and a back panel 124, which are oriented parallel to each other. Coupling portions of the armatures are sandwiched between the parallel panels at upper and lower corners of the bracket (see, e.g., FIG. 9) and fastened to the bracket by fasteners passing through aligned holes (e.g., threaded bores) in the bracket and armatures. This coupling mechanism allows a user to unfasten one (or both) armatures from the bracket at the lower corner and pivot the armature about the fastener at the upper corner (e.g., to facilitate installation of hardware or connectors, such as the passage of a cable through a cable management channel).

Figure 5:
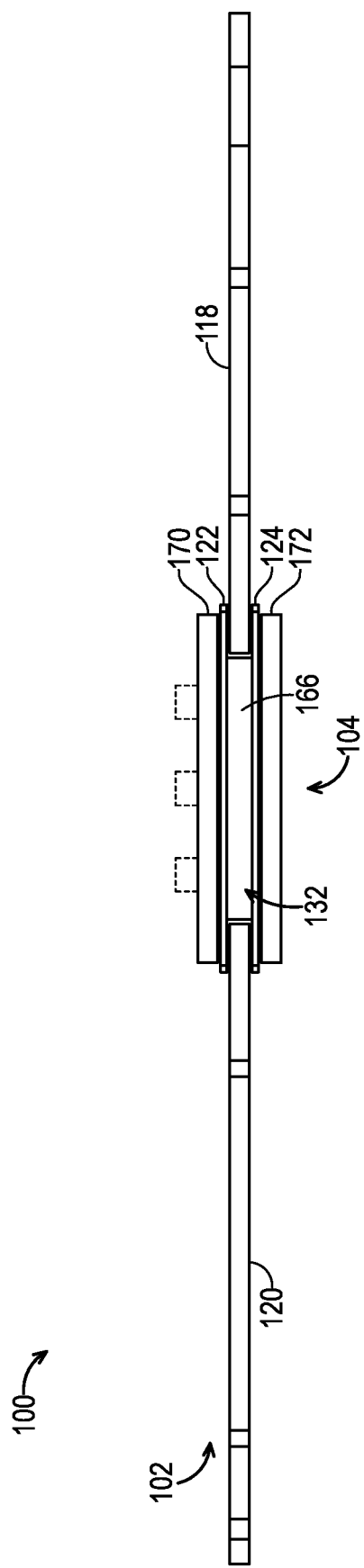
FIG. 5 is a top view of a chassis frame and mounting hub of the computer chassis of FIG. 3.

As shown in FIG. 5, which is a top view of chassis 100, respective coupling portions of left armature 118 and right armature 120 are disposed between parallel panels 122 and 124 on respective left and right sides of the panels, and are spaced from one another within the bracket by a horizontal gap.

Figure 6:
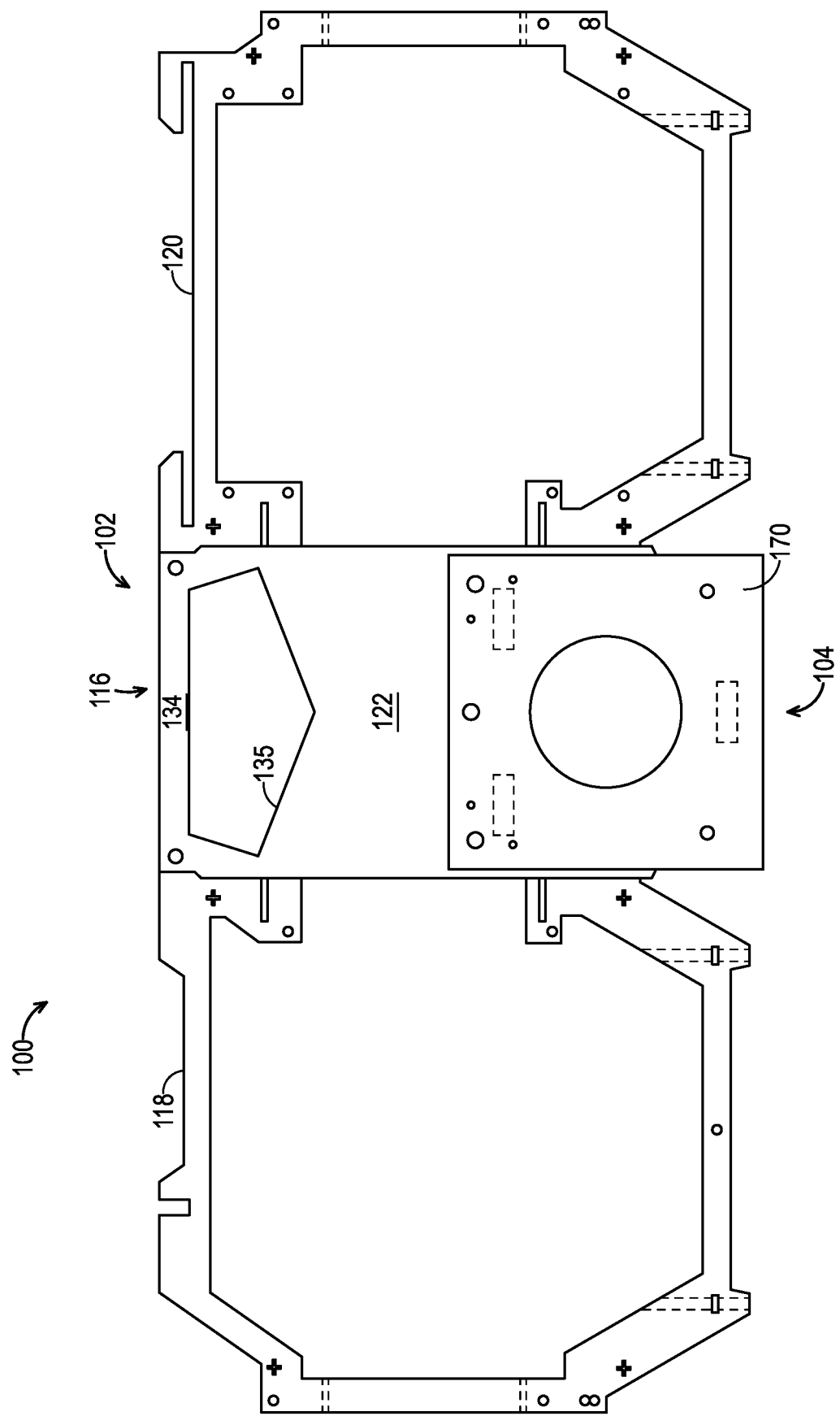
FIG. 6 is a front view of the chassis frame and mounting hub of FIG. 5.
Figure 7:
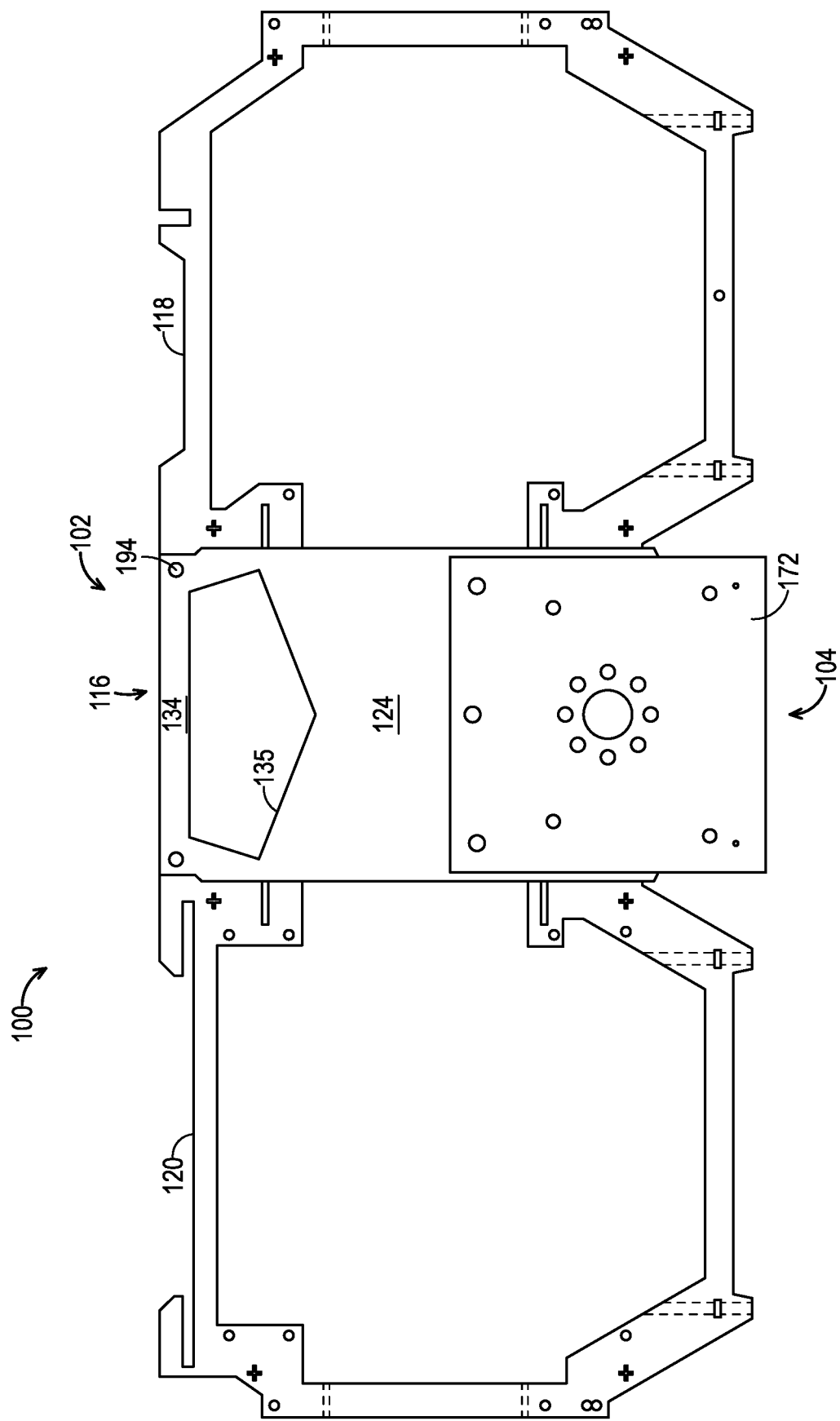
FIG. 7 is a back view of the chassis frame and mounting hub of FIG. 5.
Figure 8:
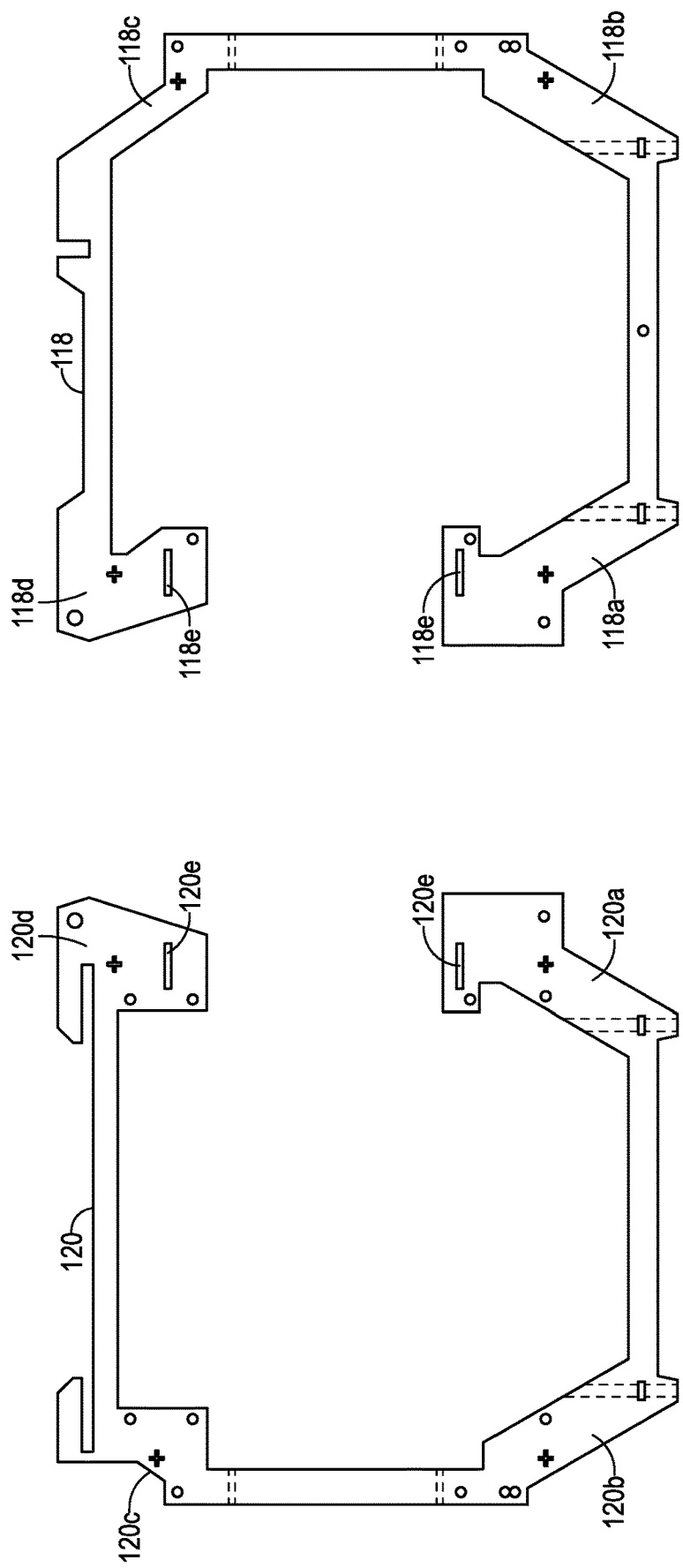
FIG. 8 is a back view of two armatures of the chassis frame of FIG. 5.

FIG. 6 is a front view of chassis 100, FIG. 7 is a back view of the chassis, and FIG. 8 is a back view of the armatures alone, uncoupled from the bracket. As FIGS. 6-8 show, armatures 118 and 120 are each generally shaped like the English character "C." Put another way, each armature forms a generally octagonal ring with a gap in the ring between the coupling portions of the armature. This general shape allows each armature to be lighter in weight than it otherwise might be (e.g., than if the armature were a planar expanse of material). Light-weight armatures allow the overall frame to be light in weight, facilitating convenient user installation and removal of frame 102 into and out of hub 104. However, in other examples, the armatures of the chassis frame may be any other shape or size suitable to be concealed behind display device 106 and support one or more mounted hardware components.

In the depicted example, armatures 118 and 120 of frame 102 include a plurality of mounting features (e.g., apertures) that allow for a variety of different orientations of hardware components and equipment mounting devices based on a range of computing, video, audio processing and/or other electronics requirements and display device sizes (see, e.g., FIG. 3). In some examples, bracket 116 also has a plurality of mounting features configured to mount hardware components, equipment mounts, and/or other suitable items. Hardware components as well as other suitable items may either be directly secured to frame 102 using the mounting features or indirectly secured to the frame using equipment mounts.

The plurality of mounting features of frame 102 may include protrusions and/or apertures configured in patterns suitable for use with devices having ITX, PCI-express, SATA, and/or other suitable standard or non-standard mounting pattern(s). The mounting features allow for flexible arrangement of hardware components so as to effectively utilize hidden space behind display device 106.

The mounting features allow the attachment and/or rearrangement of hardware components in a variety of locations, positions, and/or orientations on the chassis frame. This flexible feature of frame 102 allows chassis 100 to be customized for a range of display device sizes, support structures, and hardware components. In examples in which display device 106 is large enough, relatively large components such as a liquid-cooling radiator 160 may be mounted on a far right and/or left side of frame 102 to provide an additional heat-dissipating and cooling capability to the hardware components. In some examples, one or more chassis brackets 140 are attached to frame 102, such that accessories (e.g., USB hubs 162, computer mouse 164, and/or other peripherals) may be stored behind display device 106 (see FIG. 3).

Armatures 118, 120 are configured to facilitate placing and securing cables and/or other suitable connectors. Each armature is sized and shaped to facilitate placement of straps and/or other devices suitable for securing cables (e.g., hook-and-loop fasteners, cable ties, and/or any other suitable securing devices). Armature 118 has angled corner portions 118a, 118b, and 118c configured to facilitate fastening one or more straps. A strap can be attached to the armature with one end fastened around one of the angled corner portions and the other end fastened around another angled corner portion and/or any other suitable portion of the armature. For example, one end of the strap can be fastened to angled corner portion 118a and the other end of the strap can be fastened to angled corner portion 118c. Portions 118a and 118c are disposed at opposing corners and oriented generally parallel to teach other, which helps the strap to be secured to portions 118a, 118c without slipping (or with relatively little slipping) while maintaining structural rigidity of the armature.

Because portions 118a, 118b, and 118c are disposed at outer portions of the armature, they are relatively easy to access. In contrast, many known chassis systems facilitate securing of straps using dedicated strap-securing protrusions that are disposed within an inner space of the chassis and are thus difficult to access. Additionally, these known protrusions may occupy space that could otherwise be occupied by computer components and/or may add weight to the chassis. These downsides are avoided by portions 118a, 118b, and 118c.

Similarly, armature 120 has angled corner portions 120a, 120b, and 120c configured to facilitate fastening one or more straps.

Armature 118 further includes corner 118d and armature 120 further includes corner 120d. In the depicted example, corners 118d and 120d do not comprise angled portions, but in other examples, one or both of corners 118d, 120d may comprise angled portions.

Armature 118 includes a pair of tiedown slots 118e disposed adjacent corners 118a and 118d respectively, and armature 120 includes a pair of tiedown slots 120e disposed adjacent corners 120a and 120d respectively. The tiedown slots are each configured to receive a portion of a strap (e.g., an end portion of a strap). Like the angled corner portions, the tiedown slots facilitate placement of straps to secure cables without the need for dedicated cable-securing devices within the chassis.

The strap-facilitating features described above are configured to assist a user in cable management, which can improve airflow in the computer components, reduce surfaces on which dust might accumulate, reduce the extent to which cables impede the user's access to the computer components, and improve appearance.

Figure 9:
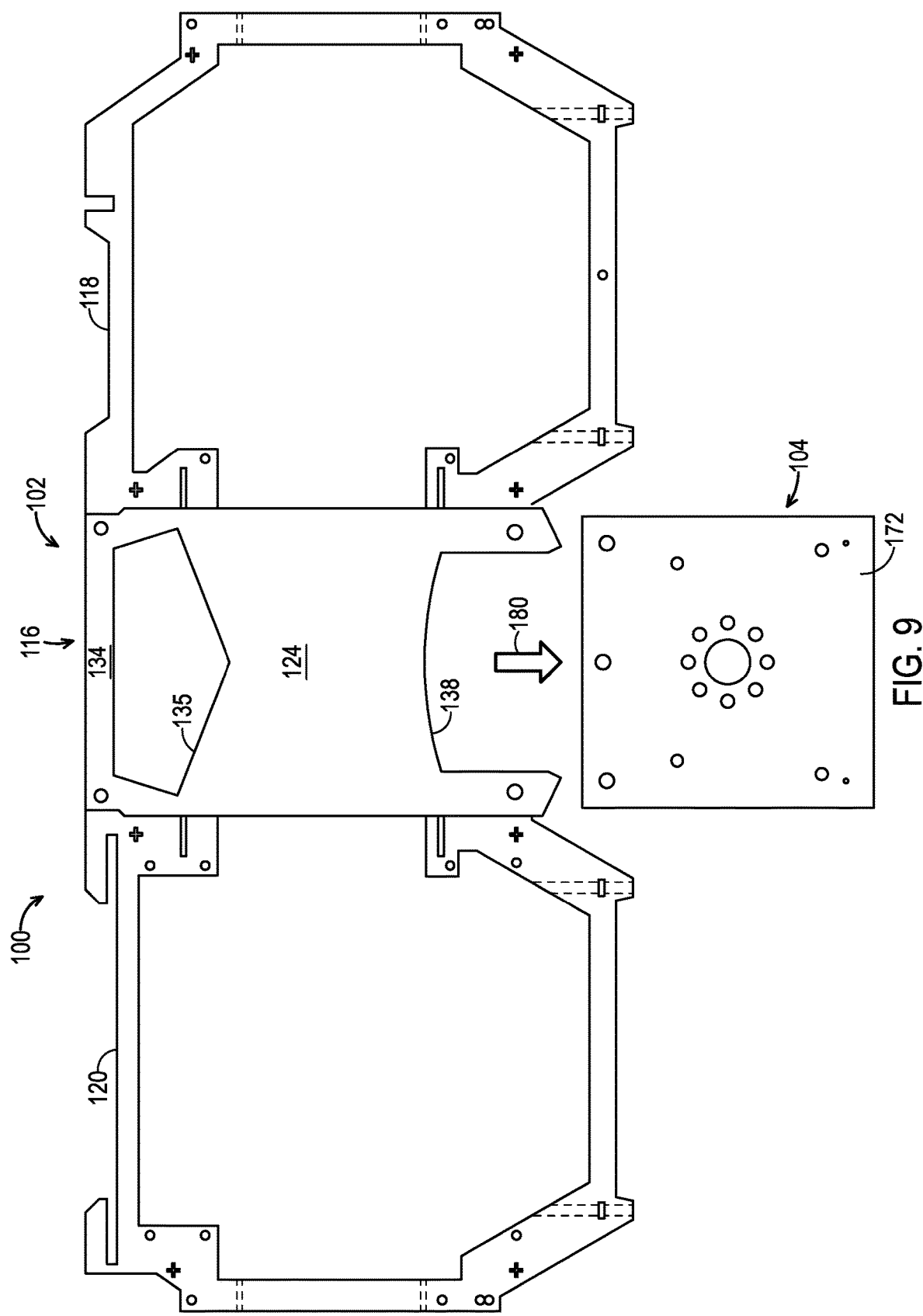
FIG. 9 is a back view of the chassis frame and mounting hub of FIG. 5, depicting the chassis frame detached from the mounting hub.

As shown in FIG. 9, a back view, frame 102 is configured to be inserted into hub 104 by lowering the frame directly downwards into the hub and to be removed from the hub by lifting the frame directly upwards out of the hub. FIG. 9 depicts frame 102 detached from hub 104, with arrow 180 depicting the downward direction of movement that would allow the frame to be inserted into the hub. In the depicted example, coupling and uncoupling of frame 102 to the mounting hub 104 can be performed without tools or fasteners. In other examples, fasteners may be provided to secure the frame within the hub.

Figure 10:
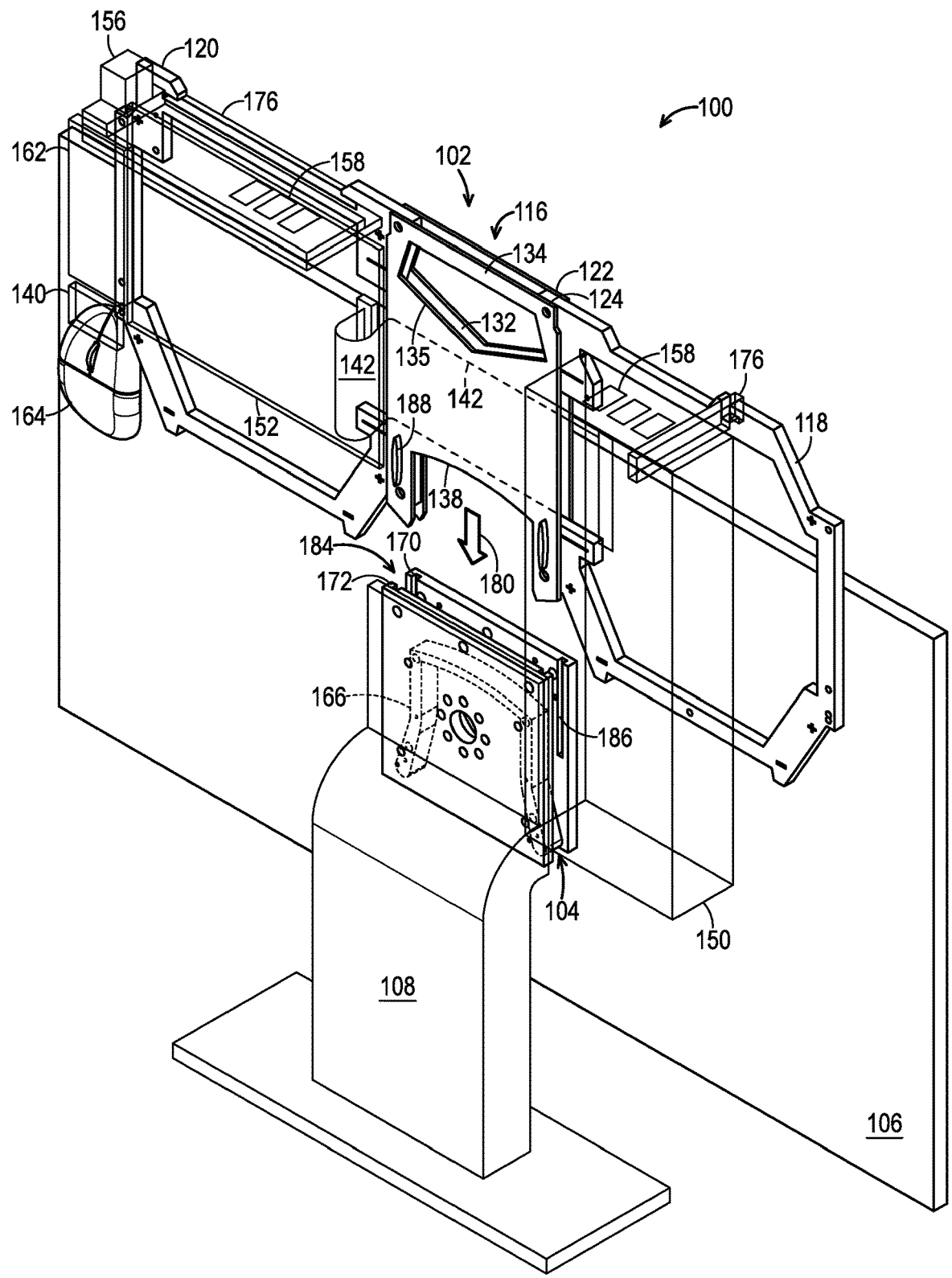
FIG. 10 is an isometric view of the computer chassis of FIG. 3 in which the chassis frame is detached from the mounting hub.

FIG. 10 is an isometric view depicting frame 102 detached from hub 104. As indicated by arrow 180, a receiving portion 138 of frame 102 is configured to be lowered into hub 104. Bracket 116 of frame 102 includes a handle 134 formed adjacent a top edge of the bracket to facilitate installation and removal of the frame from mounting hub 104. Handle 134 may be formed by, e.g., machining out a finger slot 135 from the upper portion of the panels comprising bracket 116 a small distance below the top of the bracket, and/or in any other suitable manner. A soft padding 136 may optionally be used to wrap handle 134 to increase comfort of a user (see FIG. 3).

As described above with reference to FIGS. 3-5, bracket 116 of frame 102 includes parallel panels 122 and 124, which are spaced from each other. Panels 122, 124 define between them a cable management channel 132 extending between left and right sides of the bracket. Channel 132 is configured to facilitate the connection of hardware components attached to left armature 118 to hardware components attached to right armature 120 by accommodating one or more connectors, such as illustrative cable 142 depicted in FIG. 10. In the depicted example, channel 132 corresponds to a portion of the space between panels 122, 124 configured to receive a cable or other suitable connector. In general, a cable management channel may comprise any suitable portion of the space between the panels of the bracket, including all or substantially all of the space.

The rectangular shape of the gap defined between panels 122 and 124 is configured for accommodating one or more relatively flat cables, such as riser cables; however, the gap can be used to accommodate any suitable connector(s). Cable(s) disposed within the channel are well positioned behind the computer components supported by the chassis. In this manner, the channel facilitates connection of components on different parts of the chassis (e.g., different armatures of the chassis) while hiding at least a significant portion of the connecting cable(s) from view. This enhances aesthetic appeal and reduces the risk that the cable(s) will be caught on computer components or tools (e.g., during installation or repair of the components). The channel also allows the connecting cable(s) to be disposed at a portion of the chassis that is relatively central vertically (e.g., rather than at a top or bottom portion of the chassis), which helps to keep the vertical extent of the chassis and attached components small enough to be mostly or completely concealed behind the display device.

FIG. 10 depicts cable 142 disposed in channel 132, connecting illustrative hardware components 150 and 152. Channel 132 is disposed within the bracket 116 such that any cables routed through the channel are protected by panels 122, 124 from damage that may otherwise occur due to, e.g., snagging, scraping, or crushing of the cables by other objects.

By accommodating connector(s), channel 132 facilitates arranging hardware components so as to distribute the weight of attached hardware components more evenly between armatures 118 and 120. For example, PCI-express standards applying to modern GPUs generally advise mounting GPUs directly to a motherboard, but this arrangement can result in uneven weight distribution along a chassis because the GPU and motherboard are typically both large in size (e.g., relative to other components). For example, if the GPU and motherboard were attached to a same armature of chassis 100, the overall weight of all attached components would very likely be distributed unevenly between armatures 118 and 120, and at least one of the GPU or motherboard would extend beyond the edge(s) of the display device and be visible to the computer user.

A better solution than directly attaching the GPU to the motherboard is disposing the GPU and motherboard on different sides of the central bracket (e.g., on different armatures) and to connect them to each other using a PCI-E riser cable or other suitable connector(s) (e.g., cable 142). In known systems this arrangement would be impossible because the central portion of the chassis where the connector would be disposed is occupied with interfaces coupling the chassis to the display device and/or support structure. Chassis 100 of the present teachings solves this problem by accommodating the connector within the channel of bracket 116 and receiving bracket 116 within mounting hub 104.

Attaching heavy components on opposing sides of the bracket, which is facilitated by accommodating the connecting cable(s) in channel 132, allows the weight of mounted hardware components to be distributed relatively evenly across frame 102 and provides flexibility for arranging hardware components in the hidden space behind display device 106. In the depicted example, motherboard 152 and GPU 150 are separately mounted to armatures 118 and 120 and connected to one another by riser cable 142, which is disposed within channel 132.

As shown in FIG. 10, receiving portion 138 of frame 102 comprises a recess formed at a bottom edge of bracket 116. The recess has a shape complementary to that of a mounting protrusion 166 of hub 104, such that the receiving portion is configured to mate with the mounting protrusion. This enables the receiving portion to be securely supported by the mounting protrusion within the hub.

Figure 11:
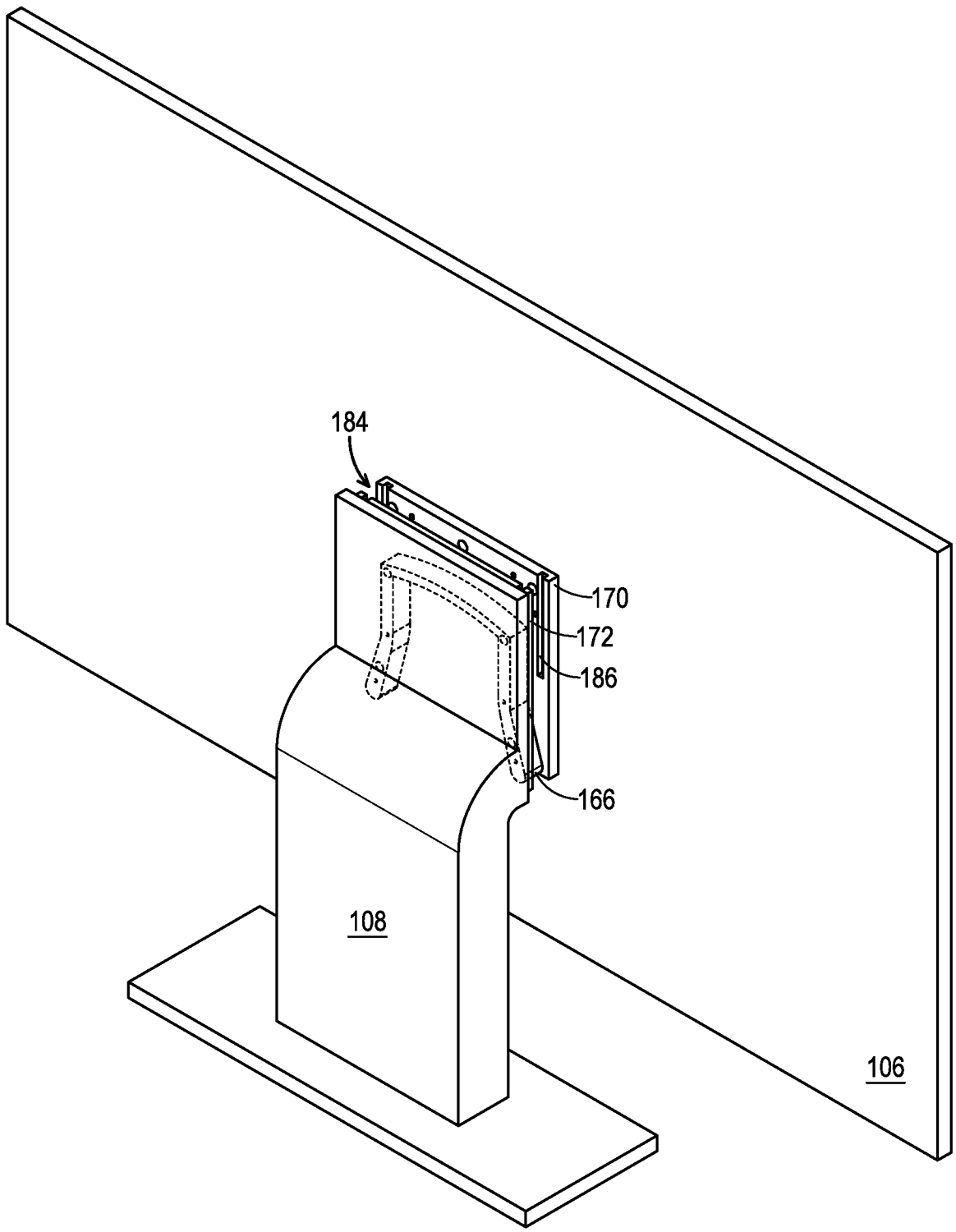
FIG. 11 is an isometric view of the mounting hub of FIG. 3 arranged between a display device and support structure in accordance with aspects of the present disclosure.
Figure 12:
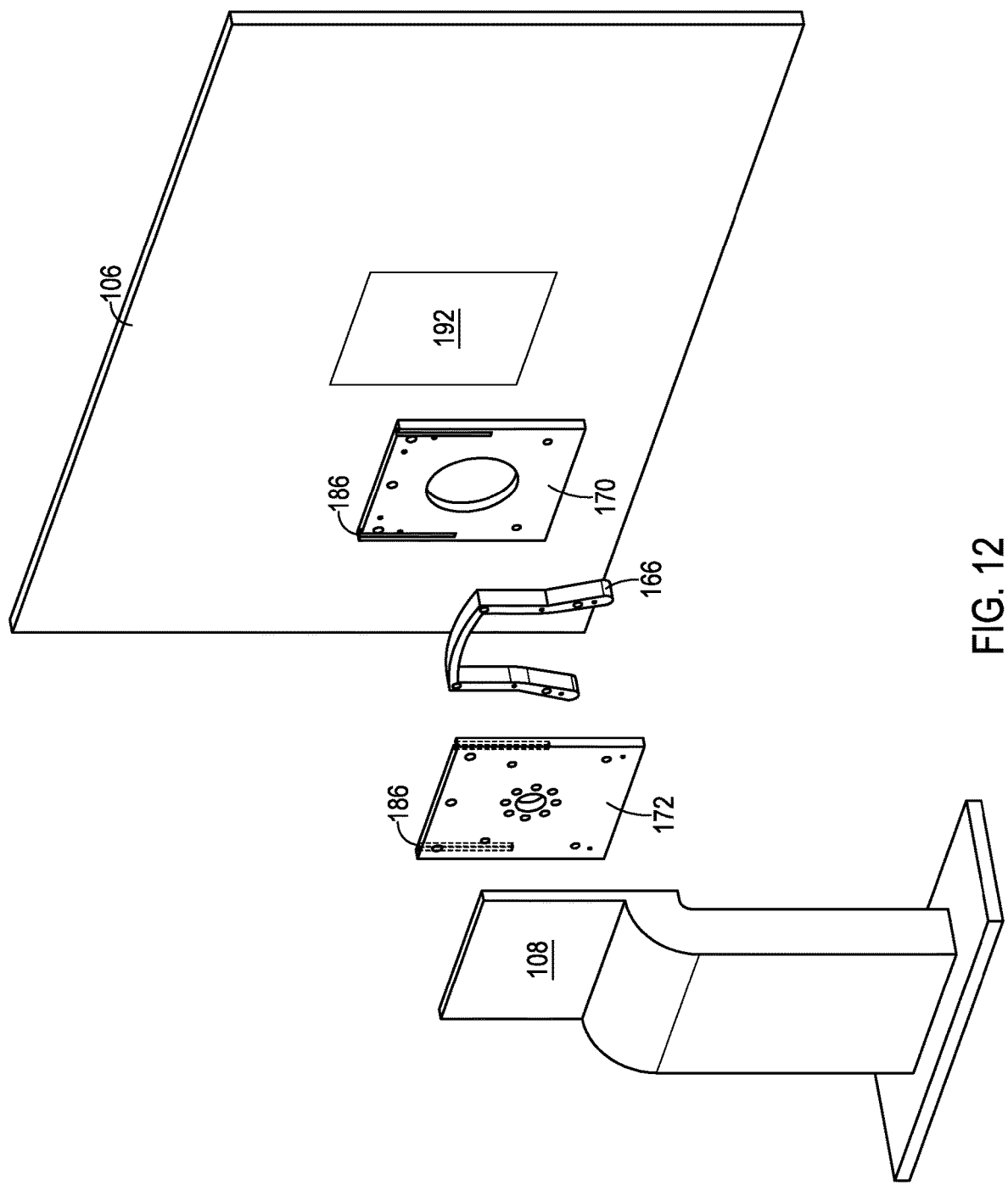
FIG. 12 is an isometric, exploded view of the mounting hub, display device, and support structure of FIG. 11
Figure 13:
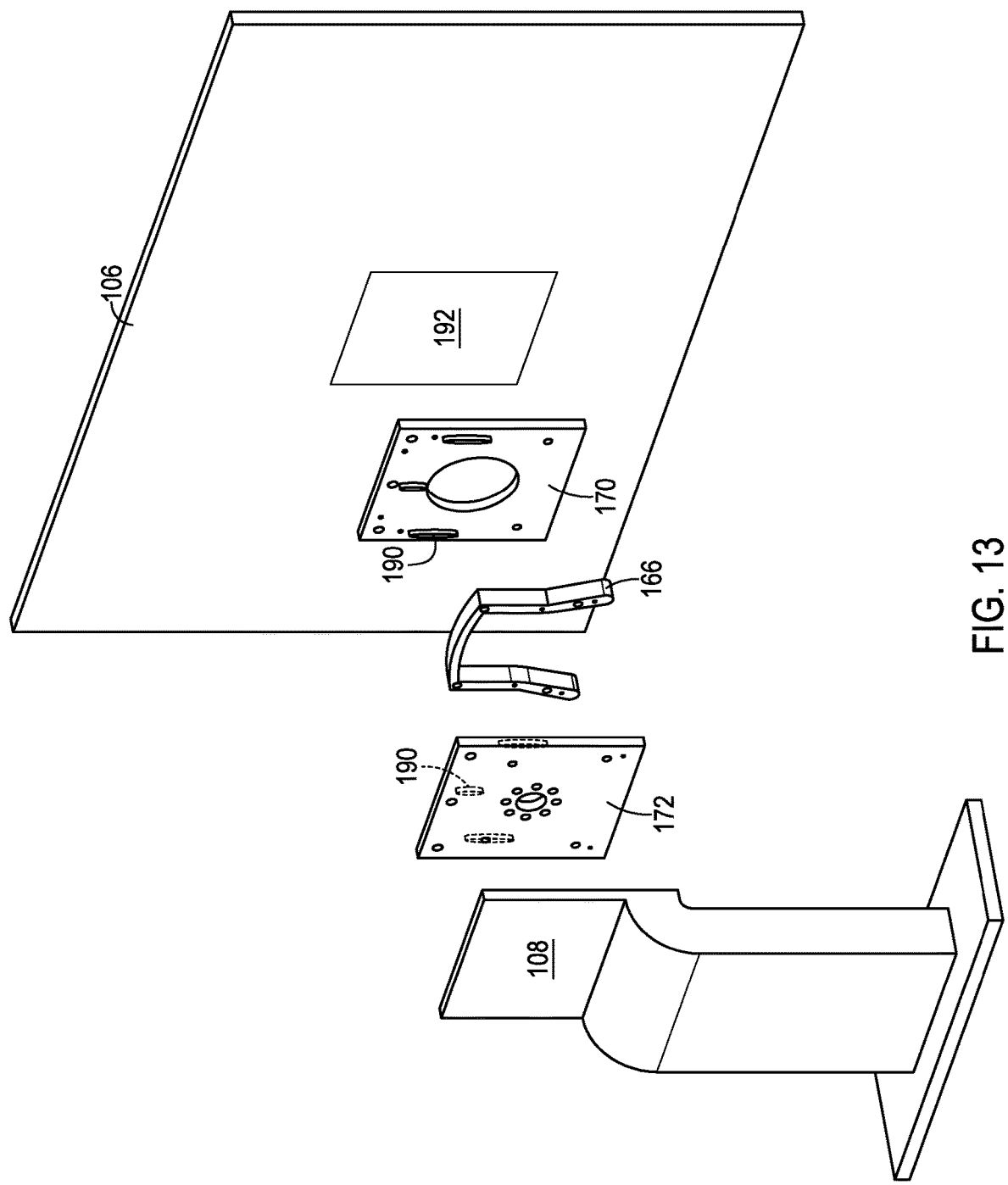
FIG. 13 is an isometric, exploded view of the mounting hub, display device, and support structure including illustrative low-friction sliders in accordance with aspects of the present disclosure.

FIG. 11 is an isometric view of mounting hub 104 coupled to display device 106 and support structure 108. FIGS. 12 and 13 are exploded views of hub 104, display unit 106, and support structure 108. Display unit 106 has an interface area, depicted schematically at 192, configured to couple to a suitable device. For instance, in some examples interface area 192 is configured to couple to a computer support structure such as structure 108, and mounting hub 104 is configured to couple to area 192. For example, area 192 may comprise a VESA mounting pattern, and hub 104 may include a VESA-compatible area configured to couple to area 192.

Hub 104 includes a front wall 170 coupled to a first side of mounting protrusion 166 and a back wall 172 coupled to a second side of the mounting protrusion, such that mounting protrusion 166 is disposed between the front and back walls of hub 104. As such, mounting protrusion 166 is disposed within a cavity 184 defined between the inward-facing surfaces of the front and back walls of hub 104. An outward-facing surface of wall 170 is configured to couple to an interface area of the display device, and an outward-facing surface of wall 172 is configured to couple to an interface area of the support structure. In the depicted example, the outward-facing surface of wall 170 includes a plurality of apertures configured to couple to a standard display device, and the outward-facing surface of wall 172 includes a plurality of apertures configured to couple to a standard computer support structure (see FIGS. 6-7).

Mounting protrusion 166 may comprise any suitable structure having a shape and size configured to support frame 102 and securely interface with receiving portion 138 of frame 102. In the depicted example, mounting protrusion 166 comprises a saddle-shaped protrusion configured to be attached to walls 170, 172 by fasteners received in apertures of the protrusion and corresponding apertures in walls 170, 172. In some examples, the mounting protrusion is integral with one wall or with both walls rather than being formed separately from the walls and attached to them by fasteners or other suitable mechanisms. For example, the protrusion and two walls may be formed as a single part, or the protrusion and one wall may be formed as a single part and connected to the remaining wall to form the mounting hub.

In the depicted example, mounting protrusion 166 is configured to be disposed within cavity 184 such that lower ends of the protrusion are disposed adjacent a bottom edge of hub 104 and a middle portion of the protrusion is disposed in a relatively higher portion of the cavity. In some examples, to accommodate display devices of various sizes, the hub is configured such that mounting protrusion 166 can be disposed at different heights within the cavity of the hub (e.g., before coupling the hub to display device 106). For example, the front and back walls of the hub may each include two or more sets of apertures disposed at different heights, such that the mounting protrusion can be selectively attached at different heights. Accordingly, because the hub is coupled to display device 106, adjusting the height of the mounting protrusion within the cavity allows frame 102 to be mounted at various heights in relation to the display device.

In some examples, sliders and/or other suitable devices configured to facilitate insertion of the chassis frame into the mounting hub are disposed on parallel panels 122 and 124 of bracket 116 and/or mounting hub 104. In the example depicted in FIGS. 10-12, inward-facing surfaces of hub walls 170, 172 include grooves 186 configured to receive sliders 188 disposed on outward-facing sides of panels 122, 124. Sliders 188 are configured to fit into grooves 186, thereby guiding the bracket 116 as it is inserted into hub 104. After installation, mating between the sliders and grooves may help to prevent unwanted movement of frame 102 relative to hub 104. In some examples, the sliders and/or grooves are configured to move against each other with relatively low friction to ease installation.

In the example depicted in FIG. 13, inward-facing surfaces of walls 170, 172 of the mounting hub include low-friction slider protrusions 190 configured to facilitate low-friction movement of the bracket relative to the mounting hub. Slider protrusions 190 may be integrated into the mounting hub walls, fastened to the walls by fastener(s) and/or adhesive(s), and/or coupled to the mounting hub walls in any other suitable manner. In some examples, slider protrusions are disposed on the bracket as well as on the mounting hub, or instead of on the mounting hub. Slider protrusions 190 may comprise nylon, acetal, and/or any other material suitable for facilitating low-friction movement.

Figure 14:
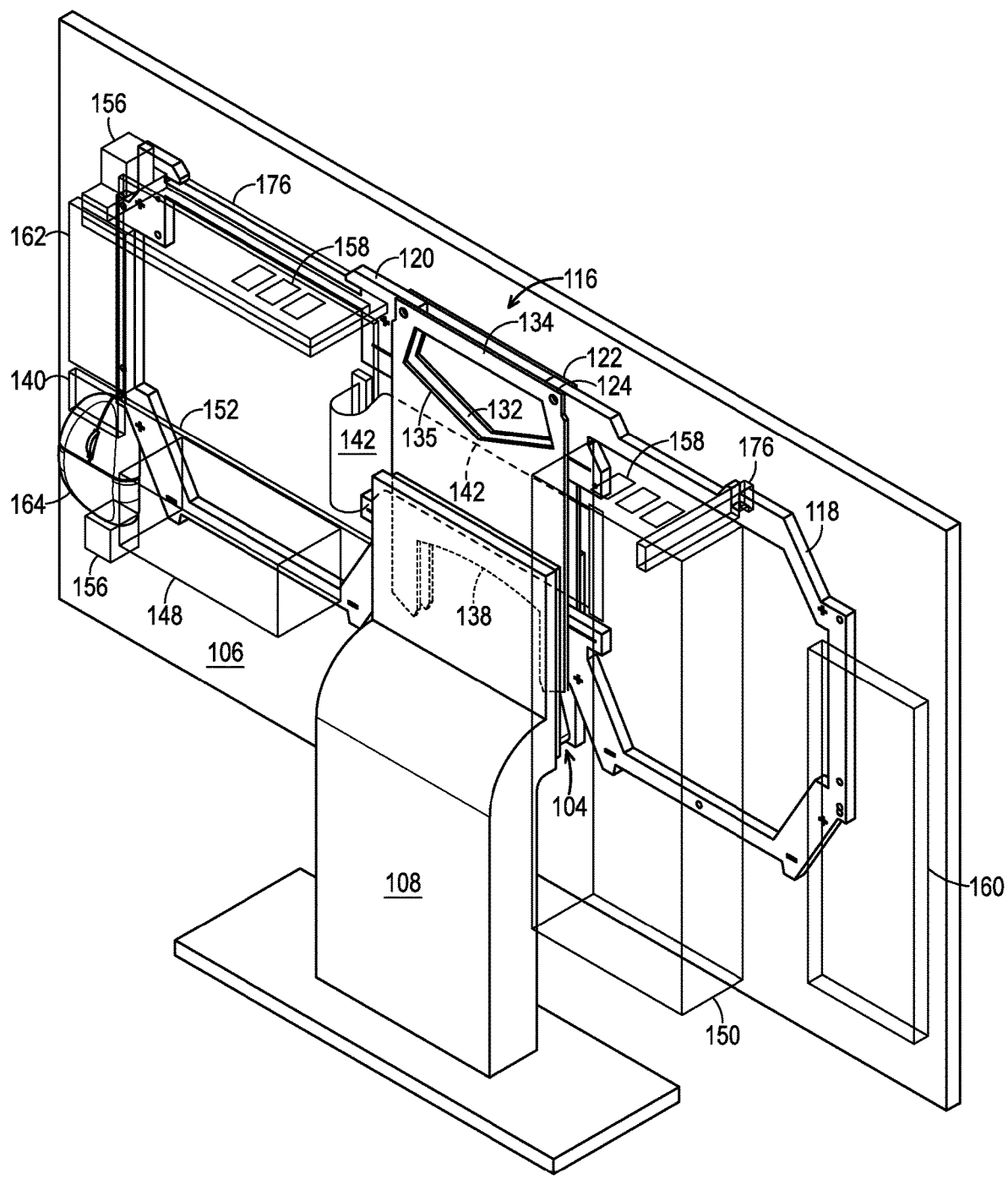
FIG. 14 is an isometric view of the computer chassis of FIG. 3 including illustrative input/output devices.

As shown in FIG. 14, one or more computing device Input/Output devices may optionally be attached to frame 102. In the example depicted in FIG. 14, the Input/Output devices include switches 156 and connector ports 158. Switches 156 and connector ports 158 are configured to be coupled to one or more hardware components (e.g., by cables and/or any other suitable connections) to provide data and/or control signals to the hardware components. The one or more Input/Output devices may be situated along the perimeter of frame 102 so as to be easily accessible from the front and/or sides of display device 106. This arrangement allows the Input/Output devices themselves to be accessible even if the hardware components controllable by such devices are situated in a part of chassis 100 that is more difficult for a user to reach or see. In the depicted example, switches 156 and ports 158 are arranged on frame 102 adjacent a top and bottom edge of display device 106.

C. Third Illustrative Computer Chassis

As shown in FIGS. 15-20, this section describes a third illustrative computer chassis 200, which is yet another example of the computer chassis described above. Computer chassis 200 includes a power supply mount 248 configured to accommodate power supplies of a variety of sizes. Chassis 200 is substantially similar to first chassis 100 in some respects. For example, chassis 200 includes chassis frame 202 and mounting hub 104, described above. In some examples, a different mounting hub may be included instead of (or in addition to) hub 104.

Figure 15:
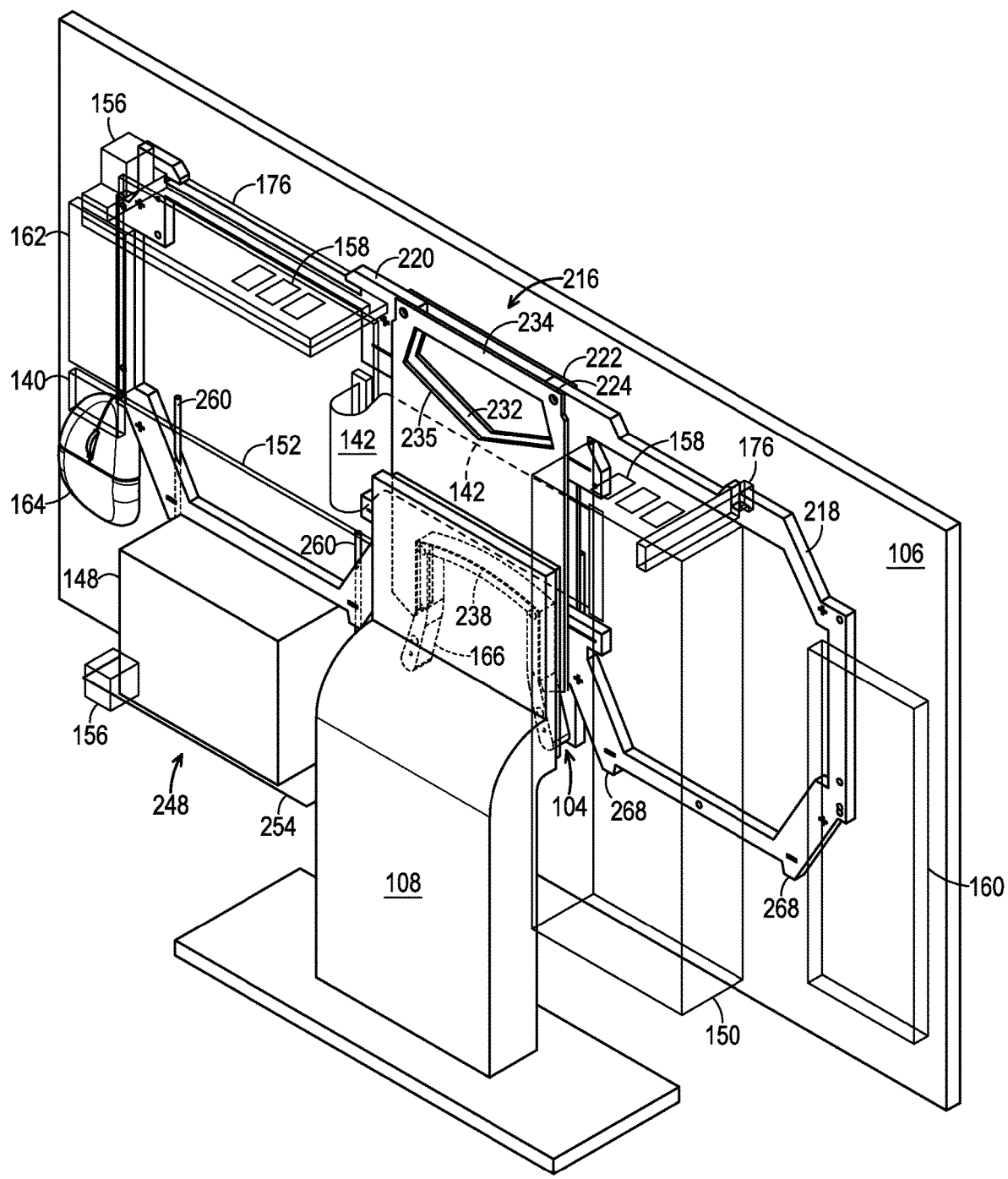
FIG. 15 is an isometric view of an illustrative computer chassis, depicting an optional power supply mount attached to the chassis, in accordance with aspects of the present teachings.
Figure 16:
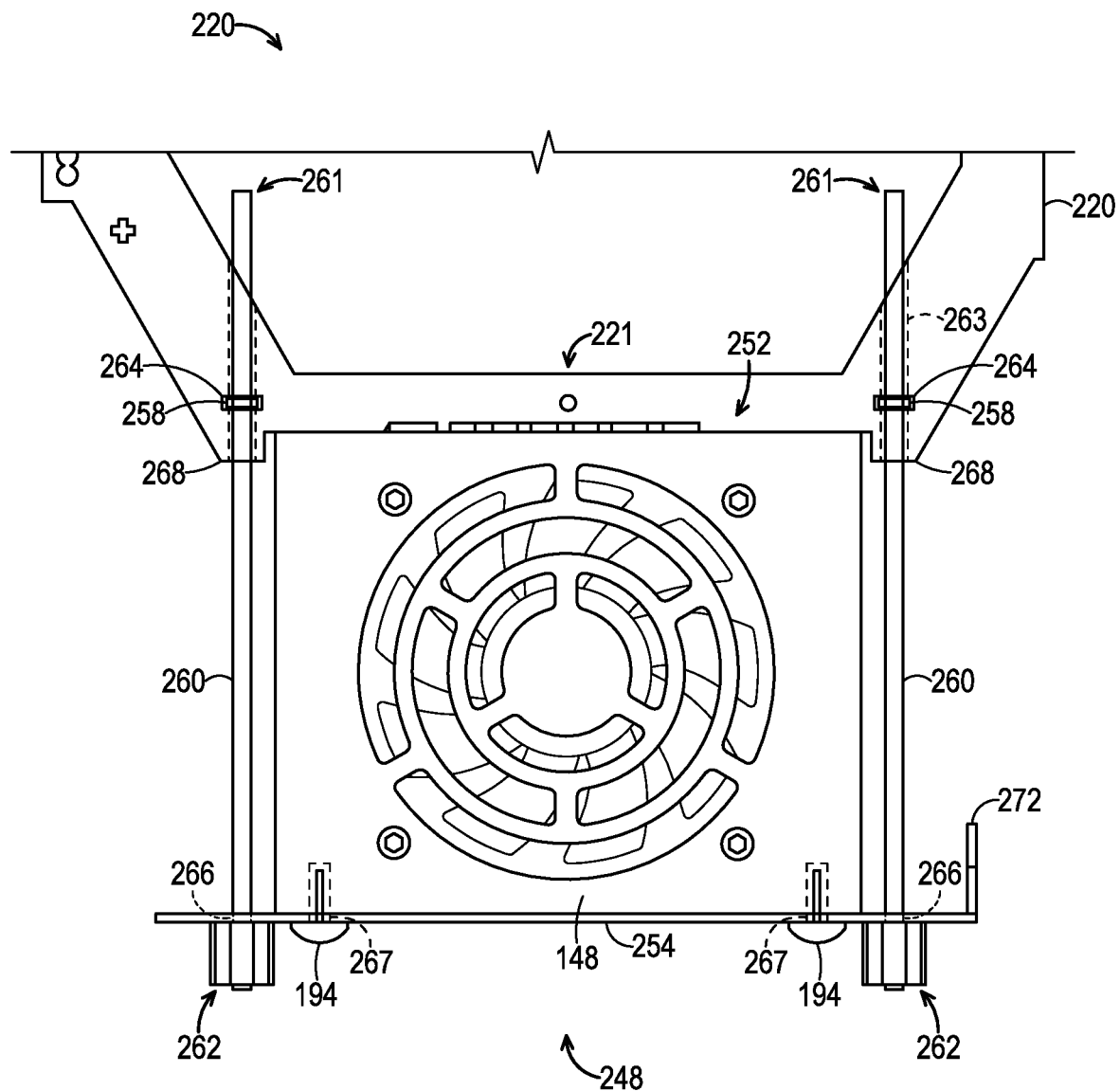
FIG. 16 is a partial back view of the illustrative power supply mount of FIG. 15.

FIG. 15 is an isometric view of computer chassis 200 disposed between and coupled to illustrative display device 106 and support structure 108. FIG. 16 is a partial back view of power supply mount 248 coupled to chassis frame 202.

A receiving portion 238 of chassis frame 202 is configured to interface with hub 104 when the frame is coupled to the hub, such that when coupled to the hub, frame 202 and attached components are concealed from view behind display device 106. Hub 104 is coupled to a rear side of display device 106, such that when chassis frame 202 is coupled to hub 104, the rear side of display device 106 provides cover for a front side of chassis 200 (i.e., the side that is immediately adjacent to the display device). A back side of frame 202 is configured to support one or more mounted hardware components such as a motherboard 152, a GPU 150, and/or any other suitable components.

Frame 202 is configured to be inserted into hub 104 by lowering the frame directly downwards into the hub and is configured to be removed from the hub by lifting the frame directly upwards out of the hub. Coupling and uncoupling of frame 202 to mounting hub 104 is achievable without tools or fasteners, although tools and/or fasteners may optionally be used.

As shown in FIG. 15, frame 202 in this example includes a left armature 218 and a right armature 220 coupled together by a bracket 216 using holes and screws or other suitable fasteners. Bracket 216 includes two parallel panels, a front panel 222 and back panel 224. Coupling portions of left armature 218 and right armature 220 are disposed between parallel panels 222 and 224 on respective left and right sides of the panels.

A channel 232 is defined between panels 222 and 224. Like channel 132, described above, channel 232 is configured to facilitate the connection of hardware component(s) attached to a left side of the chassis frame to component(s) coupled to a right side of the chassis frame by accommodating cable(s) and/or other suitable connector(s). In the example depicted in FIG. 15, illustrative cable 142 connects illustrative components 150 and 152.

As depicted in FIG. 15, bracket 216 of frame 202 includes a handle 234 configured to facilitate installation and removal of the frame from mounting hub 104. Handle 234 is at least partially defined by a finger slot 235 formed in a top portion of the bracket, such that the handle includes a portion of the bracket extending between the slot and a top edge of the bracket. In some examples, a soft padding may be used to wrap handle 234 to increase comfort of a user. A bottom edge of bracket 216 includes receiving portion 238 configured to interface with a mounting protrusion 166 of hub 204. Receiving portion 238 includes a recess along the bottom edge of bracket 216. The recess is configured to mate with the mounting protrusion of the hub.

In the depicted example, frame 202 further includes attached computing device Input/Output devices such as illustrative switches 156 and connector ports 158. The Input/Output devices are optional and are omitted in some examples.

Optionally, in some examples, one or more chassis brackets 140 are configured to attach to frame 202 and provide storage space, such that items (e.g., USB hubs 162, computer mice 164, or other peripherals) may be stored behind display device 106.

As shown in FIG. 15, a power supply mount 248 is coupled to frame 202. Power supply mount 248 extends downward from a bottom portion of right armature 220. Power supply mount 248 is an example of equipment mounts 176 configured to assist in the coupling of hardware components (e.g., illustrative power supply 148) or other suitable items to frame 202.

Figure 17:
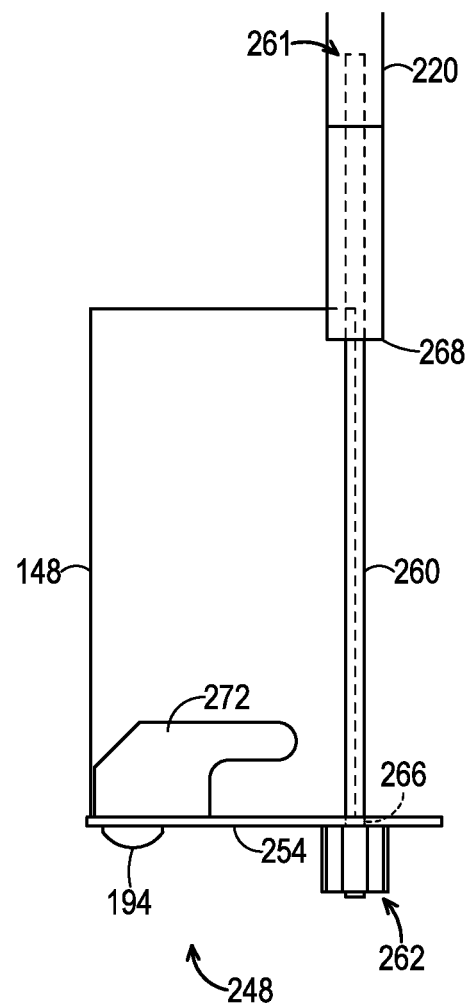
FIG. 17 is a side view of the illustrative power supply mount of FIG. 16.

FIG. 16 is a partial back view of power supply mount 248 coupled to right armature 220 and FIG. 17 is a side view of the power supply mount. Power supply mount 248 includes a supporting bracket 254, captive or square nuts 258, and two threaded thumbrods 260. Thumbrods 260 each include a threaded rod end 261 and a handle end 262 configured to be rotated by a user.

Supporting bracket 254 further includes a cable management protrusion 272 configured to facilitate organization and/or positioning of cables and/or other suitable connectors (e.g., cables connected to power supply 148). As depicted in FIG. 17, cable management protrusion 272 includes a hook-shaped piece of material coupled to a lateral portion of supporting bracket 254. In the example of FIG. 17, the cable management protrusion extends generally forward (e.g., generally toward the location of the display device), creating a recess between protrusion 272 and support bracket 254 configured to retain one or more cables and/or other suitable connector(s). Alternatively, or additionally, a cable management protrusion may be disposed in any other suitable location and/or may have any other suitable shape(s), such as apertures, grooves, and/or any other suitable shape(s), and any suitable number of cable management protrusions may be included.

In the depicted example, armature 220 includes a pair of bottom frame protrusions 268 formed on opposite ends of a bottom segment 221 of the armature. A recess defined between the pair of protrusions is disposed centrally along a bottom edge of the bottom segment. A bottom edge of bottom segment 221 of the armature engages a surface (e.g., a top surface) of a power supply sitting on support bracket 254. Protrusions 268 of the armature help to limit side-to-side movement of the power supply. A distance between the support bracket and the bottom segment of the armature can be adjusted using the thumbrods, as described below, such that the power supply is sandwiched between the support bracket and the bottom segment of the armature.

Armature 220 further includes a pair of rod passages 263 configured to receive rod ends 261 of thumbrods 260. The rod passages are disposed at opposite ends of bottom segment 221 of armatures 220. In the depicted example, rod passages 263 extend vertically through bottom frame protrusions 268. As shown in FIG. 16, armature 220 includes a pair of nut apertures 264 configured to receive a captive or square nut 258. Nut aperture 264 is perpendicularly disposed through a portion of rod passage 263, extending from a front side to back side of frame 202. In this manner, each nut aperture is configured to allow a nut to be disposed within the nut aperture such that threaded rod end 261 of thumbrod 260 is threadedly received in nut 258, thereby securing the thumbrod in the rod passage.

In some examples, the rod passages and nut apertures configured to receive thumbrods 260 are disposed in armature 218 instead of armature 220, or both armatures include respective pairs of rod passages and nut apertures.

In the depicted example, supporting bracket 254 of power supply mount 248 includes a flat sturdy sheet having a pair of rod holes 266 and a plurality of power supply mounting holes 267. Power supply mounting holes 267 are disposed along bracket 254 so as to match standardized arrangements of power supply mounting apertures. Threaded fasteners 194 each pass through one of the mounting holes and are threadedly received in the mounting apertures of the power supply to secure the power supply to the supporting bracket. Thumbrods 260 each pass through one of the rod holes 266 and each rod hole is smaller than the handle end 262 of the corresponding thumbrod, such that the supporting bracket is suspended from the armature by the thumbrods. The pair of rod holes 266 are arranged adjacent respective ends of bracket 254, such that the arrangement of holes 266 on bracket 254 mirrors the arrangement of rod passages 263 on the armature.

FIG. 16 depicts power supply 148 coupled to frame 202 using power supply mount 248. In the depicted example, power supply 148 is secured to supporting bracket 254 by screws 194. The supporting bracket is coupled to frame 202 by thumbrods 260. To attach power supply 148 to frame 202 in this manner, a user can insert rod ends 261 of thumbrods 260 through rod holes 266 in supporting bracket 254 and through rod passages 263 in frame 202. The user can hold handle ends 262 of the thumbrods (e.g., by hand and/or using a tool) to rotate the thumbrods so as to threadedly engage nuts 258 and pass the thumbrods through the nuts. The user can screw the thumbrods into the armature (e.g., into the threaded nuts) until an appropriate distance between the supporting bracket and the bottom edge of the aperture is received (e.g., until power supply 148 is fitted against frame 202).

Because the thumbrods (and thus the supporting bracket) are easily detachable from the armature, the supporting bracket can be left off the chassis when desired (e.g., if a user wishes to attach a power supply to the chassis in a different manner).

Figure 27:
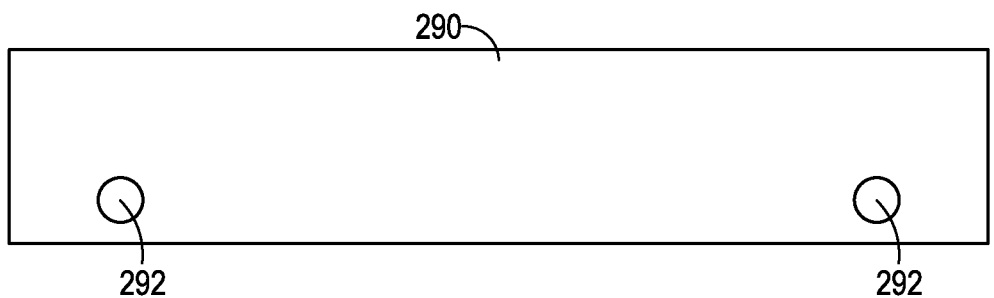
FIG. 27 is a top view of an illustrative power supply supporting bracket in accordance with aspects of the present teachings.
Figure 28:
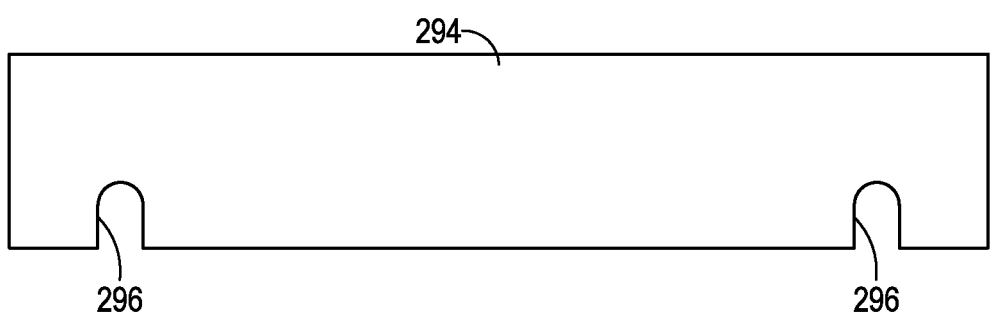
FIG. 28 is a top view of another illustrative power supply supporting bracket in accordance with aspects of the present teachings.

In some examples, the supporting bracket includes one or more slots rather than rod holes 266. Each slot comprises an opening in the supporting bracket that extends to an edge of the bracket and is configured to receive a thumbrod. This allows the bracket to be coupled to the thumbrod simply by placing the thumbrod into the slot at the edge of the bracket, without inserting an end of the thumbrod through a hole in the bracket. Similarly, the bracket can be decoupled from the thumbrod without extracting the end of the thumbrod through the hole. Accordingly, the thumbrod(s) can be inserted into the rod passages of the armature and/or screwed into the threaded nuts before the bracket is coupled to the thumbrod(s), and/or the bracket can be uninstalled from the armature without removing the thumbrod(s) from the armature. This can simplify installation of the power supply assembly on the chassis frame, removal of the power supply assembly from the chassis frame, and/or replacement of one PSU with another PSU. FIG. 27 is a top view of an illustrative supporting bracket 290 having rod holes 292; bracket 290 is substantially similar to bracket 254. FIG. 28 is a top view of an illustrative supporting bracket 294 having slots 296.

Figure 18:
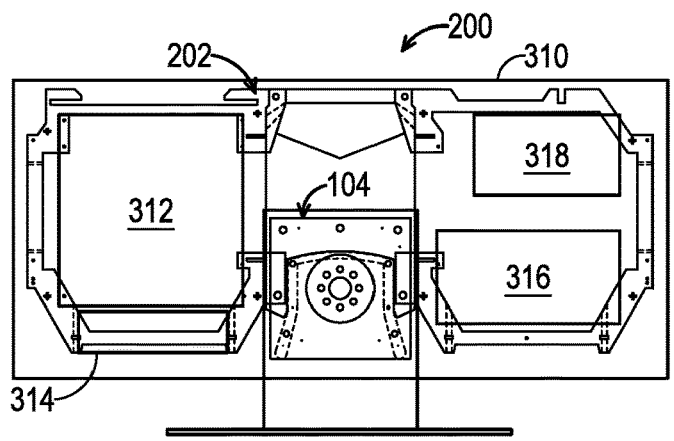
FIG. 18 is a back view of the computer chassis of FIG. 15, depicting an illustrative arrangement of hardware components suitable for use with a small display device.
Figure 19:
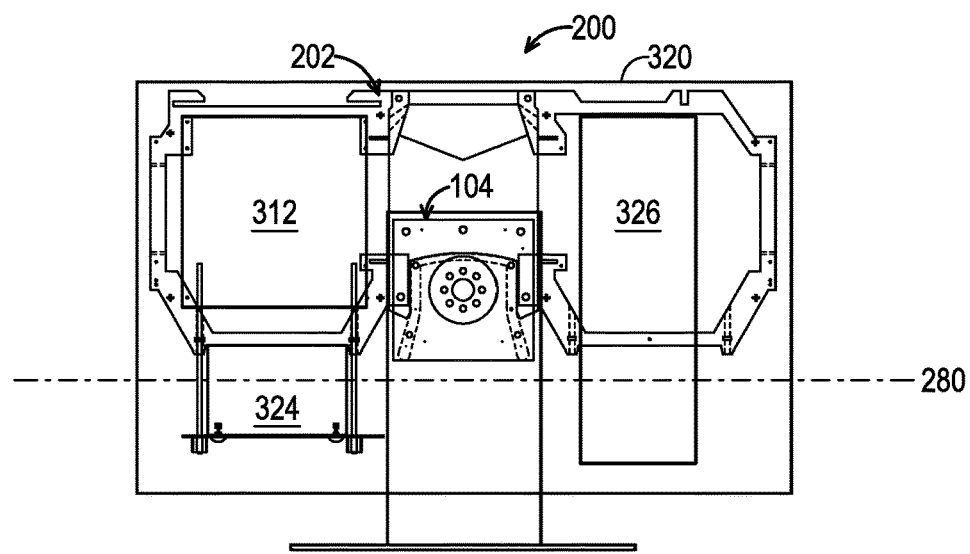
FIG. 19 is another back view of the computer chassis of FIG. 15, depicting an illustrative arrangement of hardware components suitable for use with a medium display device.
Figure 20:
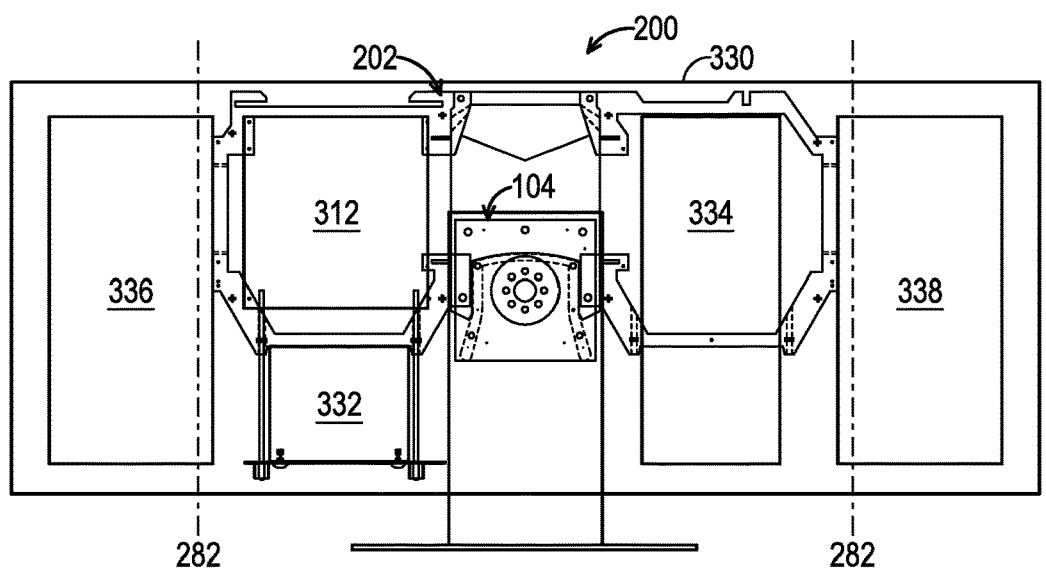
FIG. 20 is yet another back view of the computer chassis of FIG. 15, depicting an illustrative arrangement of hardware components suitable for use with a large display device.

FIGS. 18-20 are rear views depicting example hardware arrangements on chassis 200. The three arrangements may, for example, correspond to three different levels of computing power. Accordingly, the arrangements of FIGS. 18-20 demonstrate the customizable capability of frame 202 to position and house various types and sizes of hardware components behind different sized display devices 310, 320, 330 while efficiently using hidden space behind the display. Illustrative computer components of the example hardware arrangements are depicted schematically and shown as transparent. The bracket of the chassis frame is depicted as transparent as well.

FIG. 18 depicts a small display device 310 and chassis 200 with computing hardware installed that is relatively small in size. In some cases, smaller-sized hardware corresponds to lower computing power. The depicted illustrative small computing hardware includes an ITX-sized motherboard 312, a Pico-PSU power supply 314, a 3.5-inch storage device 316, and a single-board computer 318. In the depicted example, due to the limited amount of hidden space behind small display device 310, power supply mount 248 would extend below display device 310 if attached. Accordingly, mount 248 has been removed from frame 202, and power supply 314 is mounted directly onto frame 202. By arranging all the components of the low-powered computing hardware on frame 202 as shown, all components of the example computing hardware set are concealed behind small display device 310.

FIG. 19 depicts an example desktop computer with medium-sized computer hardware and a medium sized 4:3 or 16:9 aspect-ratio display device 320. Medium-sized computer hardware may, e.g., include components suitable for computer gaming. The example computing hardware includes ITX-sized motherboard 312, a standard SFX power supply 324 and a full-size 2- or 3-slot graphics processing unit 324. Medium display device 330 is taller than display device 310, creating more vertical hidden space and allowing for more components to extend vertically from frame 202 than is possible within the hidden space of display device 310. A dot-dash line 280 indicates the added height of display device 320 as compared to display device 310. The example computing hardware incorporates a larger SFX power supply 324 to provide power to graphics processing unit 326. In the depicted example, SFX power supply 324 is mounted to frame 202 using power supply mount 248. By utilizing power supply mount 248, SFX power supply 324 may be spaced further from motherboard 312 than is possible without the power supply mount and still be concealed behind the display, taking further advantage of the hidden space behind medium display device 320.

FIG. 20 depicts an example desktop computer with large-sized computer hardware and a large, ultra-wide-class 21:9 aspect-ratio display device 330. The large-sized hardware may correspond to, e.g., media-creation or video production computing hardware. The example media-creation or video production computing hardware includes ITX-sized motherboard 312, a SFX-L power supply 332, a 3- to 4-slot dual graphics processing unit 334, a first radiator 336 for cooling components on motherboard 312 and a second radiator 338 for cooling the graphics processing unit 334. Large display 330 is much wider than previous monitors 310 and 320, allowing not only for more vertical component arrangements on frame 202 relative to monitor 310, but for more horizontal component arrangements than monitor 310 or 320. Dot-dash lines 282 indicate the added width of display device 330 as compared to display device 320. In the depicted example, radiators 336, 338 are attached to the armatures by fasteners received in passages in outboard portions of the armatures. The passages are depicted in dashed lines in FIGS. 18-20.

D. More Examples of Computer Chassis

Figure 21:
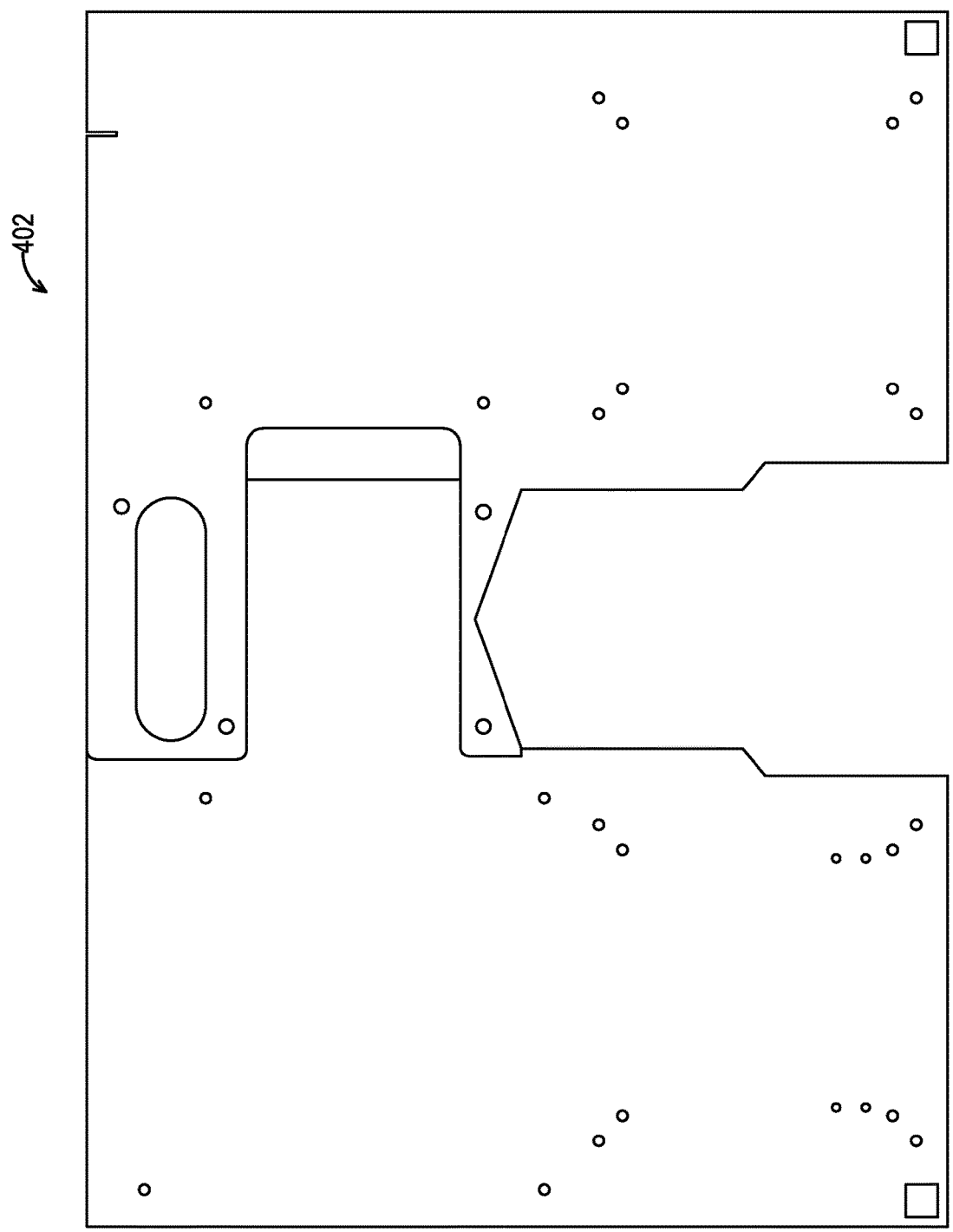
FIG. 21 is a back view of another illustrative chassis frame in accordance with aspects of the present teachings.
Figure 22:
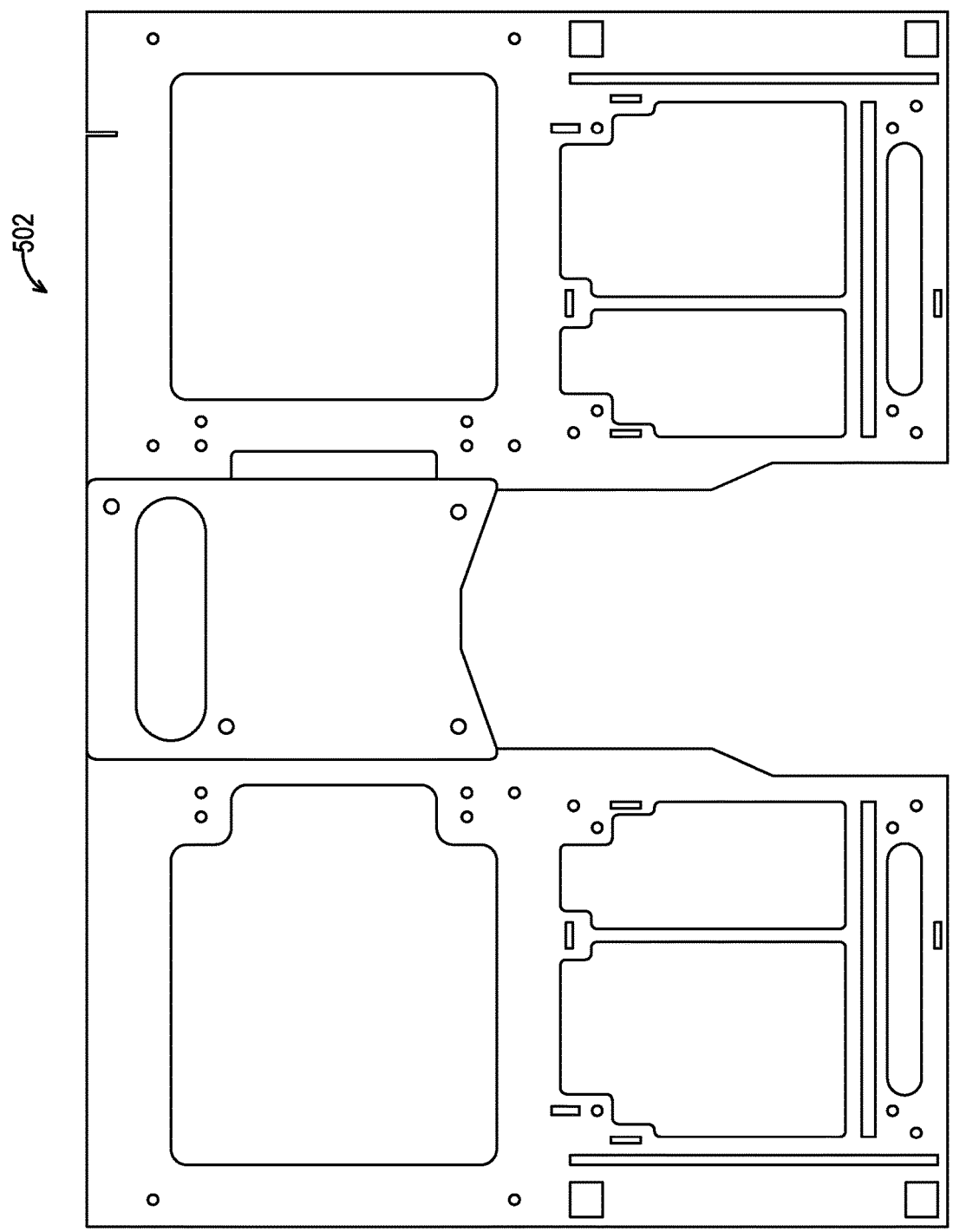
FIG. 22 is a back view of yet another illustrative chassis frame in accordance with aspects of the present teachings.
Figure 23:
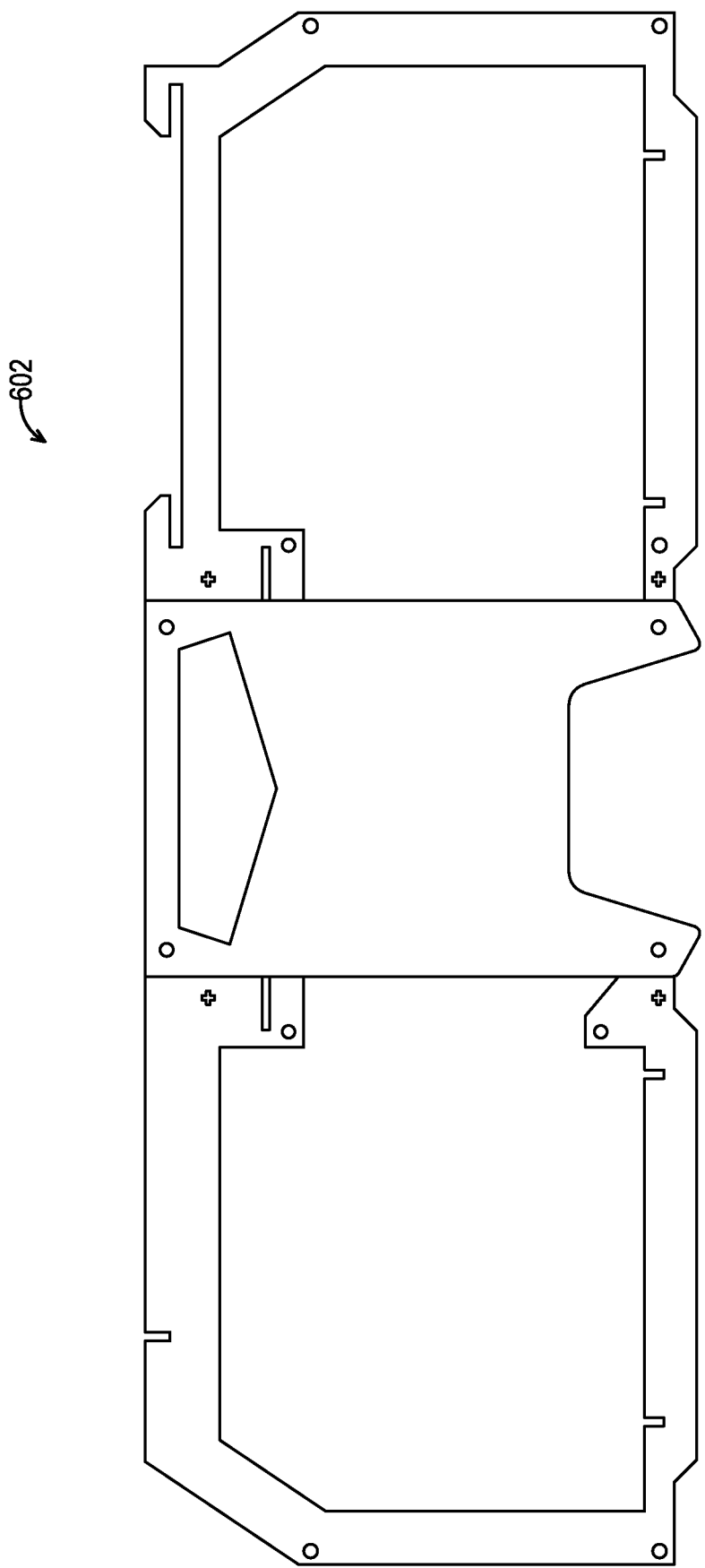
FIG. 23 is a back view of yet another illustrative chassis frame in accordance with aspects of the present teachings.

As shown in FIGS. 21-23, this section describes additional illustrative computer chassis frames each of which is yet another example of the computer chassis frame described above.

FIG. 21 depicts a chassis frame 402 including two planar armatures. Each planar armature has a respective medial portion extending from a planar expanse toward the other armature, and the armatures are disposed such that the medial portions at least partially overlap. A receiving recess is defined below the overlapping medial portions and inboard edges of the planar expanses. The recess is configured to engage a mounting protrusion and/or other suitable portion of a mounting hub. In the depicted example, the armatures of chassis frame 402 are twice the vertical length of armatures of chassis frame 102 and 202; however, in general, the armatures may have any suitable size. A plurality of apertures in the armatures facilitate attachment of computer components.

FIG. 22 depicts a chassis frame 502 having two armatures coupled to a bracket optionally including a cable management channel. Chassis frame 502 includes armatures twice the length of the bracket, but in other examples, the armatures and/or bracket may have any other suitable size(s). A plurality of apertures in the armatures facilitate attachment of computer components. Armatures of frame 502 comprise planar expanses having openings (which may, e.g., be machined out of the armature). The openings may facilitate airflow and tend to make the overall weight of frame 502 less than the weight of frame 402, but in some examples still more than the weight of frames 102 or 202. A recess defined by the lower edge of the bracket and inboard edges of the armatures is configured to engage a mounting hub.

FIG. 23 depicts a chassis frame 602 including two armatures coupled together by a bracket. The armatures are generally shaped like the English-alphabet letter "C." Compared to frame 102, the armatures of frame 602 are smaller, closer in shape to a three-sided square, and do not extend lower than a lower edge of the bracket when coupled to the bracket. The bracket includes a recess configured to engage a mounting hub.

E. Illustrative Riser Cable Installation Method

Figure 24:
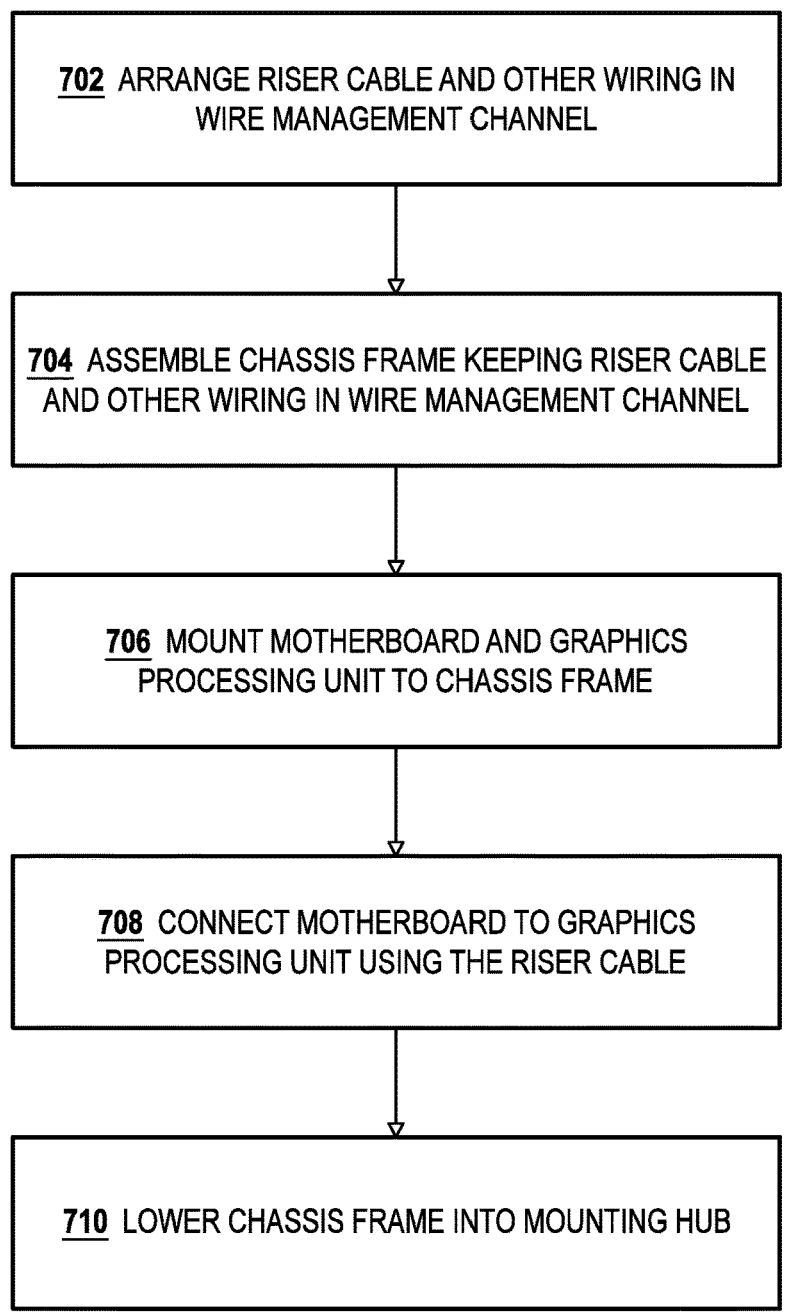
FIG. 24 is a flow chart depicting steps of an illustrative method for installing a riser cable on a chassis frame according to aspects of the present teachings.

This section describes steps of an illustrative method 700 for installing a riser cable; see FIG. 24. Aspects of computer chassis described above may be utilized in the method steps described below. Where appropriate, reference may be made to components and systems that may be used in carrying out each step. These references are for illustration, and are not intended to limit the possible ways of carrying out any particular step of the method.

FIG. 24 is a flowchart illustrating steps performed in an illustrative method 700, and may not recite the complete process or all steps of the method. Although various steps of method 700 are described below and depicted in FIG. 24, the steps need not necessarily all be performed, and in some cases may be performed simultaneously or in a different order than the order shown.

Step 702 of method 700 includes placing a riser cable and/or other suitable connector(s) in a cable management channel of a chassis frame bracket. In some examples, the bracket includes a pair of parallel panels spaced from each other by a gap, and the channel is defined by the panels, such that the channel extends between open left and right sides of the bracket. Placing the cable in the channel may include inserting the cable through the left side of the bracket until it emerges from the right side (or vice versa).

Step 704 includes assembling the chassis frame, keeping the riser cable in place in the channel (e.g., with ends of the cable extending from respective left and right sides of the bracket). Assembling the frame may include attaching a pair of armatures to the bracket and/or any other suitable step(s). In some examples, each armature (or just one of the armatures) is configured to connect to the bracket at two connection points and is already connected to the bracket at a first one of the two connection points when method 700 begins. This allows the armature to be pivoted about the first connection point (e.g., a fastener of the first connection point) so that it is out of the way and does not interfere with placement of the riser cable in the bracket channel at step 702. In these examples, step 704 includes pivoting the armature back into place such that it can be connected to the bracket at the second connection point as well, and connecting the armature to the bracket at the second connection point.

In some examples, step 702 is performed when each armature is already fully attached to the bracket (e.g., at each of two connection points), and step 704 is omitted.

Step 706 includes attaching a motherboard and GPU to the chassis frame. The motherboard and GPU are attached to different ones of the armatures (e.g., with the motherboard on the left armature and the GPU on the right armature, or vice versa). Optionally, step 706 includes attaching additional computer components to the armatures.

Step 708 includes connecting the motherboard and GPU to the riser cable disposed in the channel (e.g., without removing the cable from the channel). By the end of step 708, the motherboard is attached to one of the armatures and the GPU to the other armature, and the riser cable passes through the bracket and electrically connects the motherboard and GPU.

Step 710 includes lowering the chassis frame into a mounting hub, thereby assembling a computer chassis. In a typical example, the mounting hub is attached to a computer stand or other support structure prior to performing step 710, such that by the end of step 710, the chassis frame is mounted on a mounting hub that is itself mounted to a computer stand. In some examples, a monitor or other suitable display device is already attached to the mounting hub before beginning step 710.

F. Illustrative Power Supply Mounting Method

Figure 25:
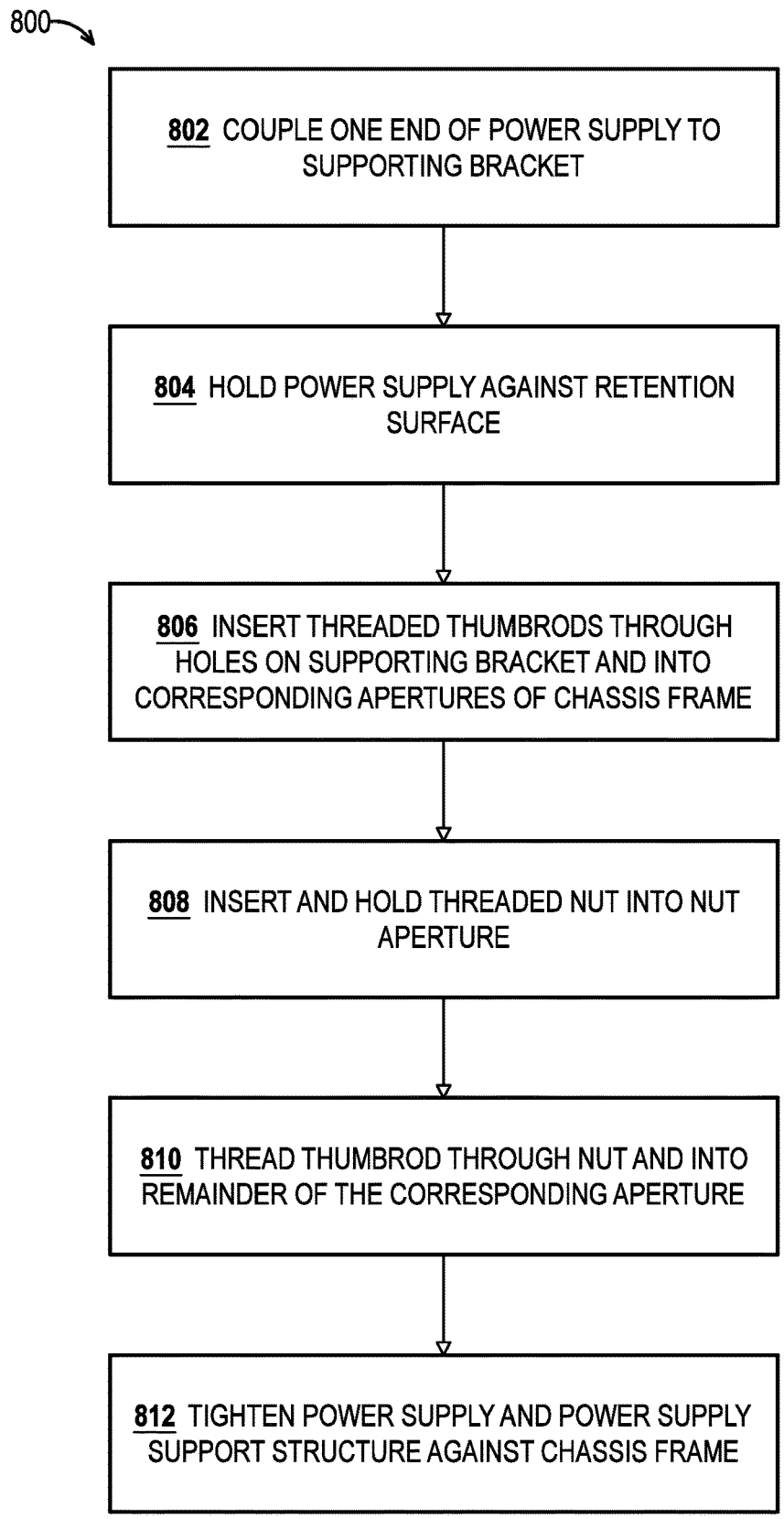
FIG. 25 is a flow chart depicting steps of an illustrative method for mounting a power supply to a chassis frame using a power supply mount according to aspects of the present teachings.

This section describes steps of an illustrative method 800 for mounting a power supply onto a chassis frame using a power supply mount; see FIG. 25. Aspects of mounting a power supply using the power supply mount described above may be utilized in the method steps described below. Where appropriate, reference may be made to components and systems that may be used in carrying out each step. These references are for illustration, and are not intended to limit the possible ways of carrying out any particular step of the method.

FIG. 25 is a flowchart illustrating steps performed in an illustrative method, and may not recite the complete process or all steps of the method. Although various steps of method 800 are described below and depicted in FIG. 25, the steps need not necessarily all be performed, and in some cases may be performed simultaneously or in a different order than the order shown.

Step 802 of method 800 includes coupling the power supply to a supporting bracket using, e.g., screws. A typical power supply has a pattern of threaded mounting apertures on at least one end each configured to receive a screw so as to securely mount the power supply to some structure. The supporting bracket of the present example includes a pattern of apertures compatible with at least one power supply mounting pattern (e.g., an industry standard pattern or a nonstandard pattern). In some examples the supporting bracket includes a plurality of mounting hole patterns each matching a different pattern, such that the supporting bracket is configured to couple to a variety of industry standard power supply mounting patterns. This step includes disposing the power supply on the supporting bracket so that all the threaded apertures are visible through the appropriate mounting holes, and inserting screws (or other suitable fasteners) through the mounting holes on a bottom side of the support bracket and into corresponding threaded apertures of the power supply.

Step 804 of method 800 includes arranging the power supply coupled to the supporting bracket against a retention rail and/or other suitable surface of the chassis frame. In some examples, the retention surface comprises a bottom edge of a bottom segment of the chassis frame. This step includes orienting the power supply such that a rear surface of the power supply lies against the retention surface of the chassis frame. This step may include a user holding the power supply and/or support bracket such that the power supply contacts the retention surface in preparation for step 806, described next.

Step 806 of method 800 includes inserting the rod end of a thumbrod through a rod hole in the supporting bracket and partially through a rod passage of the chassis frame. Step 808 of method 800 includes inserting a nut into a nut aperture of the chassis frame. The nut aperture is oriented transverse to the rod passage and disposed such that the rod passage passes through a central portion of the nut aperture. In this manner, the rod being inserted into the rod passage passes into the nut aperture and can be screwed into the nut by the user at step 810. The threaded engagement of the rod and nut secures the rod in the rod passage.

In this example, step 806 includes inserting the rod into the rod passage up to the nut aperture, then step 808 includes inserting the nut into the nut aperture, and step 810 includes screwing the rod through the nut to secure the supporting bracket to the chassis frame. In other examples, the nut may already be in place in the corresponding nut aperture before the user begins inserting the rod into the rod passage.

In examples in which the power supply mount system includes two or more rods and rod passages, method 800 includes repeating steps 806-810 for the remaining rod(s). For example, the system may include a pair of rods and rod passages configured to couple the support bracket to the chassis frame via a pair of rod holes in the support bracket, as in the example depicted in FIGS. 15-16. In some examples, steps 806-810 are performed for one rod and then for the remaining rod(s). In some examples, step 806 is performed for each rod, then step 808 is performed for each rod, and so on. In general, the steps for all rods may be performed in any suitable order.

Step 812 of method 800 includes tightening the thumbrod(s) by turning the handle ends of the thumbrod(s), so that the supporting bracket is securely coupled to the chassis frame. In some examples this step includes tightening the thumbrod(s) until the top of the power supply securely engages a bottom surface of the chassis frame (e.g., of an armature of the frame), such that the power supply is sandwiched between the bottom surface and the supporting bracket.

In examples wherein the supporting bracket includes slot(s) extending to the edge of the bracket rather than holes spaced from the edges of the bracket, the power supply may be mounted to the chassis by attaching the bracket to the power supply (e.g., using screws); inserting captive nut(s) into aperture(s) of the armature; threading thumbrod(s) into the armature such that a portion of each thumbrod extends from the armature (e.g., a portion at least slightly longer than a length of the power supply); positioning the power supply and bracket assembly such that a top of the power supply rests against a bottom edge of the armature and the thumbrod(s) are disposed in the slot(s) of the bracket; and tightening the thumbrods to shorten a distance between the bracket and the bottom edge of the armature, until the power supply is sandwiched securely between the bracket and the armature.

G. Illustrative Chassis Assembly Method

Figure 26:
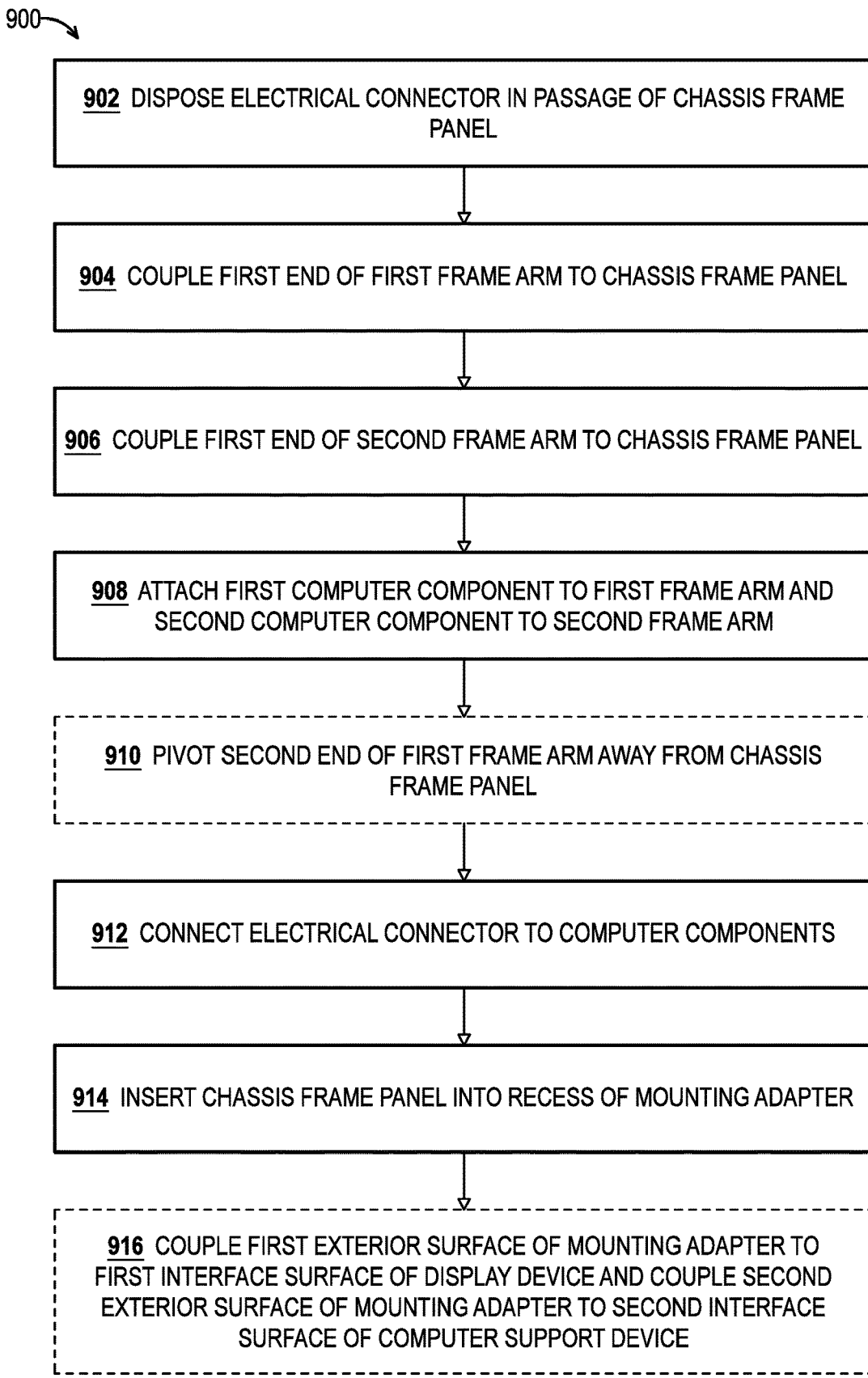
FIG. 26 is a flow chart depicting steps of an illustrative method of assembling a computer chassis according to aspects of the present disclosure.

This section describes steps of an illustrative method 900 for assembling a computer chassis; see FIG. 26. Aspects of computer chassis described above may be utilized in the method steps described below. Where appropriate, reference may be made to components and systems that may be used in carrying out each step. These references are for illustration, and are not intended to limit the possible ways of carrying out any particular step of the method.

FIG. 26 is a flowchart illustrating steps performed in an illustrative method, and may not recite the complete process or all steps of the method. Although various steps of method 900 are described below and depicted in FIG. 26, the steps need not necessarily all be performed, and in some cases may be performed simultaneously or in a different order than the order shown.

At step 902, method 900 includes disposing an electrical connector in a passage of a chassis frame panel, such that first and second ends of the electrical connector extend from respective first and second sides of the chassis frame panel.

At step 904, method 900 includes coupling a first end of a first frame arm to the chassis frame panel. At step 906, method 900 includes coupling a first end of a second frame arm to the chassis frame panel. One or both frame arms may be pivotably coupled to the chassis frame panel. In some examples, the frame arms extend in opposing lateral directions from the frame panel.

At step 908, method 900 includes attaching a first computer component to the first frame arm and a second computer component to the second frame arm. In some examples, the first component is a motherboard and the second component is a GPU. Being disposed on different frame arms, the first and second components may be separated by a distance larger than the separation distance typically allowed by conventional systems between large components such as a motherboard and GPU. For example, the first and second components may in some examples be separated by a distance in the range of 4-8 inches, which may facilitate use of a riser cable having a length in the range of, e.g., 6-16 inches (depending on factors such as the size and orientation of the first and second components). In general, any suitable separation distance between components and any suitable cable length may be used.

At step 910, method 900 optionally includes pivoting a second end of the first frame arm away from the chassis frame panel to facilitate aspects of assembly of the chassis. For example, pivoting the second end of the first frame arm away from the chassis frame panel may move the first frame arm out of the way so that it is easier for a user to connect one or more cables (or other suitable connectors) to computer components supported by the chassis (e.g., at step 912 below, and/or at any other suitable stage in assembly or later modification of the chassis).

At step 912, method 900 includes connecting the first end of the electrical connector to the first computer component and connecting the second end of the electrical connector to the second computer component.

At step 914, method 900 includes inserting the chassis frame panel into a recess of a mounting adapter (AKA a mounting hub) such that at least a portion of the electrical connector is disposed within the recess.

At step 916, method 900 optionally includes coupling a first exterior surface of the mounting adapter to a first interface surface of a display device and coupling a second exterior surface of the mounting adapter to a second interface surface of a computer support device.

In some examples, method 900 further includes suspending a shelf (e.g., a power supply mount) from the first and/or second frame arms using threaded rods and/or any other suitable connectors. In some examples, method 900 further includes attaching at least a third computer component to one or both frame arms. In some examples, method 900 includes removing a computer component (e.g., the first, second, or third component, and/or any other suitable component) from the associated frame arm, and may further include reinstalling the computer component in a different position and/or orientation in the chassis.

H. Illustrative Combinations and Additional Examples

This section describes additional aspects and features of computer chassis, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A computer chassis device comprising:
   a mounting hub configured to receive a chassis frame; and
   a chassis frame configured to securely mount hardware components, the chassis frame including two armatures connected by a bracket;
   wherein the mounting hub is configured to be arranged between a display device and support structure of a desktop computer such that the frame may be mounted behind the display unit when received by the mounting hub.

A1. The computer chassis device of A0 wherein the mounting hub comprises a front wall, mounting protrusion, and back wall, the mounting protrusion disposed between the walls such that the front wall is coupled to a first side of the mounting protrusion and the back wall mounted to a second side of the mounting protrusion.

A2. The computer chassis device of any one of A0-A1 wherein the chassis frame further includes a receiving portion formed through a bottom edge of the bracket.

A3. The computer chassis device of any one of A0-A2 wherein the receiving portion is configured to interface with the mounting protrusion of the hub.

A4. The computer chassis device of A0 wherein the mounting hub further comprises a mounting interface configured to connect the hub to the display device and the support structure A5. The computer chassis device of A4 wherein the mounting interface comprises a pattern of protrusions and apertures configured to engage with a mounting area on the display device or support structure.

A6. The computer chassis device of A3, wherein the mounting hub further includes low-friction sliders configured to facilitate convenient installation and coupling of the frame to the mounting hub.

B0. A mounting hub comprising:
   a mounting hub assembly to be arranged between a display device and a support structure;
   a mounting interface to connect the device to the support structure, using a hole pattern matching support structure mount holes and secured with screws;
   a mounting interface to connect the device to the display device, using a hole pattern matching display device mount holes and secured using screws or tabs;
   a saddle-shaped protrusion to receive and locate an electronics device chassis frame; and
   an engagement slot to secure an electronics device chassis frame.

B1. The mounting device of B0, wherein the saddle-shaped protrusion is arranged within and adjacent to parallel walls to engage with surface edges of the electronics device chassis frame.

B2. The mounting device of B0, wherein the engagement slot is lined with low-friction sliders.

B3. The mounting device of B0, wherein the engagement slot is located beneath the topmost mount holes and above the bottom edge of the mounting hub assembly.

B4. The mounting hub of B2, wherein the low-friction sliders include protrusions disposed on inner walls of the mounting hub.

C0. A frame comprising:
   a central assembly that locates and secures the frame to the mounting device (AKA mounting hub), allowing toolless connection and removal of the assembled frame from the hub assembly without first needing to disassemble or disconnect the mounting device;
   a cable management channel that encloses and secures component, peripheral or other cables within the device;
   a planar mounting arrangement of electronics components, peripherals and cooling apparatus using a minimal amount of spatial depth behind the display device;
   open lateral panels nearest the display device which use the display device casing and structure to form a forwardmost enclosure for the electronics device chassis;
   mounts that locate hardware on or within the device;
   placement of I/O (e.g. switches, dials, connector ports) along the frame's perimeter;
   a padded handle comprising the centermost portion of the top of the frame for removal of the frame from the mounting device;

D0. A method of installing a power supply in an electronics chassis comprising
   a retention rail;
   a mounting plate; and
   threaded receptacles within the chassis frame that receive mounting rods;
   one or more threaded mounting rods that extend the length of the power supply.

D1. The method of D0, wherein chassis mounting receptacle through-holes provide variable-depth power supply size compatibility and therefore variable volumetric capacity of power supply area of the computer chassis.

D2. The method of D0, wherein the retention rail comprises a bottom surface of the chassis.

E1. A chassis for a computer, the chassis comprising:
a chassis frame including a medial panel and first and second lateral frame portions extending from the medial panel, the first and second lateral frame portions each configured to support one or more computing components; and
a mounting hub having a first side configured to couple to a support structure and a second side configured to couple to a display device, and an opening configured to receive a lower portion of the medial panel of the chassis frame.

E2. The chassis of paragraph E1, wherein the mounting hub comprises first and second plates disposed facing each other such that an inward-facing surface of the first plate is spaced from an inward-facing surface of the second plate, and the opening of the mounting hub is defined between the inward-facing surfaces.

E3. The chassis of paragraph E2, wherein an outward-facing surface of the first plate comprises the first side of the mounting hub and an outward-facing surface of the second plate comprises the second side of the mounting hub.

E4. The chassis of paragraph E2, wherein the mounting hub further comprises a support bridge disposed between the inward-facing surfaces, and the lower portion of the medial panel of the chassis frame is configured to engage the support bridge when the lower portion is received in the opening of the mounting hub.

E5. The chassis of paragraph E4, wherein the lower portion of the medial panel of the chassis frame has a concave shape and the support bridge of the mounting hub has a convex shape configured to mate with the concave shape of the lower portion.

E6. The chassis of paragraph E5, wherein the chassis frame is configured to be coupled to the mounting hub by only a friction fit between the medial panel of the chassis frame and the support bridge and inward-facing surfaces of the mounting hub.

E7. The chassis of paragraph E1, wherein the medial panel of the chassis frame has a channel configured to receive a cable connecting a component supported by the first lateral frame portion of the chassis frame to a component supported by the second lateral frame portion of the chassis frame.

E8. The chassis of paragraph E7, wherein the medial panel of the chassis frame comprises a pair of panels disposed facing each other and defining the channel between them.

E9. The chassis of paragraph E8, wherein portions of the first and second lateral frame portions of the chassis frame are sandwiched between the panels.

E10. The chassis of paragraph E9, wherein the first and second lateral frame portions comprise C-shaped armatures.

E11. The chassis of paragraph E1, wherein the first and second sides of the mounting hub comprise VESA-compatible interfaces.

F1. A chassis for supporting computer components behind a display device, the chassis comprising:
a frame including a central bracket comprising a pair of panels spaced from each other by a gap, and a pair of support arms each configured to couple to one or more computer components, wherein each of the support arms has a first end sandwiched between the panels; and
a mounting hub configured to couple to a display device, the mounting hub including a recess configured to receive at least a portion of the central bracket such that at least a portion of the gap is disposed within the recess.

F2. The chassis of paragraph F1, wherein the mounting hub is further configured to couple the frame to a computer support device.

F3. The chassis of paragraph F1, wherein at least one of the support arms is C-shaped and further includes a second end sandwiched between the panels of the central bracket.

F3a. The chassis of paragraph F3, wherein the at least one of the support arms has a first angled portion extending from the second end, a second angled portion connected to the first angled portion by a first horizontal portion, and a third angled portion connected to the second angled portion by a first vertical portion, wherein the third angled portion is substantially parallel to the first angled portion.

F3b. The chassis of paragraph F3a, wherein the first vertical portion is disposed at an outboard side of the support arm.

F3c. The chassis of paragraph F3, wherein the first and second ends of the at least one support arms each include a slot configured to receive a strap.

F3d. The chassis of paragraph F3c, wherein the slots are substantially parallel to each other.

F4. The chassis of paragraph F1, wherein the first end of at least one of the support arms is pivotably coupled to the central bracket.

F5. The chassis of paragraph F1, wherein the mounting hub includes a protrusion disposed within the recess and configured to engage the central bracket when the central bracket is received in the recess.

F6. The chassis of paragraph F5, wherein the protrusion is disposed entirely within the recess.

F7. The chassis of paragraph F5, wherein a lower edge of the central bracket comprises a groove and the protrusion is dimensioned to be received in the groove.

F8. The chassis of paragraph F5. wherein the mounting hub comprises a pair of plates disposed facing each other such that the recess is defined between inward-facing surfaces of the plates, and the protrusion is disposed between the plates.

F9. The chassis of paragraph F8, wherein the protrusion is disposed entirely between the plates.

F10. The chassis of paragraph F8, wherein an outward-facing surface of a first one of the plates is configured to couple to the display device.

F11. The chassis of paragraph F10, wherein the outward-facing surface of the first one of the plates comprises a plurality of apertures configured to couple to a Video Electronics Standards Association (VESA) mounting pattern.

F12. The chassis of paragraph F8, wherein an outward-facing surface of a second one of the plates is configured to couple to a computer support device.

F13. The chassis of paragraph F12, wherein the outward-facing surface of the second one of the plates comprises a plurality of apertures configured to couple to a VESA-compatible mounting pattern of the computer support device.

F14. The chassis of paragraph F1, further comprising a shelf coupled to a first one of the support arms by at least one threaded rod threadedly received in a bore of the first one of the support arms, such that a distance between the shelf and the first one of the support arms is adjustable by screwing or unscrewing the threaded rod.

G1. A method for supporting one or more computer components behind a display device, the method comprising:

supporting a first computer component using a first arm of a chassis frame, the first arm extending from a first side of a central bracket;

supporting a second computer component using a second arm of the chassis frame, the second arm extending from a second side of the central bracket;

receiving a bottom portion of the central bracket in a recess of a mounting hub, wherein the mounting hub has a first interface configured to removably couple to a computer support device and a second interface configured to removably couple to a display device; and receiving a cable within a passage of the central bracket such that at least a portion of the cable is disposed between the first and second interfaces.

G2. The method of paragraph G1, wherein the cable is coupled to the first and second computer components.

G3. The method of paragraph G1, wherein the display device comprises a computer monitor.

G4. The method of paragraph G1, wherein the first interface comprises a first planar surface configured to engage a planar surface of the computer support device when the first interface is coupled to the computer support device.

G5. The method of paragraph G4, wherein the first interface has a plurality of apertures configured in a VESA mounting pattern.

G6. The method of paragraph G5, wherein the second interface comprises a second planar surface configured to engage a planar surface of the display device when the second interface is coupled to the display device.

G7. The method of paragraph G6, wherein the second interface has a plurality of apertures configured to align with a VESA mounting pattern of the display device.

G8. The method of paragraph G1, wherein supporting the first computer component includes receiving, in one or more apertures of the first arm of the chassis frame, one or more fasteners fastening the first computer component to the first arm.

G9. The method of paragraph G1, wherein the first computer component is a graphical processing unit (GPU).

G10. The method of paragraph G9, wherein the second computer component is a motherboard.

H1. A method of assembling a computer chassis, the method comprising:

disposing an electrical connector in a passage of a chassis frame panel, such that first and second ends of the electrical connector extend from respective first and second sides of the chassis frame panel;

coupling a first end of a first frame arm to the chassis frame panel;

coupling a first end of a second frame arm to the chassis frame panel;

attaching a first computer component to the first frame arm and a second computer component to the second frame arm;

connecting the first end of the electrical connector to the first computer component and connecting the second end of the electrical connector to the second computer component; and inserting the chassis frame panel into a recess of a mounting adapter.

H2. The method of paragraph H1, wherein the electrical connector comprises a riser cable.

H3. The method of paragraph H1, wherein the first computer component comprises a motherboard and the second computer component comprises a graphical processing unit (GPU).

H4. The method of paragraph H3, wherein the motherboard and the GPU are separated by a distance of at least three inches.

H5. The method of paragraph H1, wherein disposing the electrical connector in the passage of the chassis frame panel is performed prior to attaching the first computer component to the first frame arm, prior to attaching the second computer component to the second frame arm, or prior to attaching the first computer component to the first frame arm and prior to attaching the second computer component to the second frame arm.

H6. The method of paragraph H1, wherein: attaching the first end of the first frame arm to the chassis frame panel is performed prior to disposing the electrical connector in the passage, and wherein attaching the first end of the first frame arm to the chassis frame panel comprises pivotably attaching the first end to the chassis frame panel, the method further comprising pivoting a second end of the first frame arm away from the chassis frame panel to facilitate connecting the first end of the electrical connector to the first computer component.

H7. The method of paragraph H1, further comprising suspending a shelf from the first arm using at least one threaded rod threadedly received in a bore of the first frame arm, and selectively screwing the threaded rod into the bore such that a power supply disposed on the shelf is sandwiched between the shelf and the first frame arm.

H8. The method of paragraph H1, further comprising coupling a first exterior surface of the mounting adapter to a first interface surface of a display device and coupling a second exterior surface of the mounting adapter to a second interface surface of a computer support device.

H9. The method of paragraph H8, wherein coupling the first exterior surface to the first interface surface includes disposing the first exterior surface and the first interface surface in direct contact and fastening the first exterior surface and the first interface surface together, and coupling the second exterior surface to the second interface surface includes disposing the second exterior surface and the second interface surface in direct contact and fastening the second exterior surface and the second interface surface together.

H10. The method of paragraph H9, wherein a mounting saddle is disposed within the recess of the mounting adapter, and inserting the chassis frame panel into the recess includes engaging the mounting saddle with a bottom surface of the chassis frame panel.

H11. The method of paragraph H1, wherein inserting the chassis frame panel into the recess of the mounting adapter includes inserting the chassis frame panel such that at least a portion of the electrical connector is disposed within the recess.

J1. A method of installing a power supply unit (PSU) to a chassis, the method comprising:

attaching a PSU to a support shelf;

inserting a rod into a passage of a chassis frame, such that a portion of the rod extends from the chassis frame;

coupling the support shelf to the rod, such that the PSU is disposed between the support shelf and a side of the chassis frame; and inserting the rod further into the passage, such that the PSU is sandwiched between the support shelf and the side of the chassis frame.

J2. The method of paragraph J1, wherein the rod is inserted into the passage prior to coupling the support shelf to the rod.

J3. The method of paragraph J2, wherein the support shelf has a slot or groove extending inward from an edge of the support shelf, and coupling the support shelf to the rod includes receiving the extending portion of the rod in the slot or groove.

J4. The method of paragraph J1, wherein the support shelf is coupled to the rod after the rod is inserted into the passage of the chassis frame.

J5. The method of paragraph J4, wherein coupling the support shelf to the rod includes inserting the rod through a hole in the support shelf, the hole being spaced from all edges of the support shelf.

J6. The method of any one of paragraphs J1-J5, wherein a captive nut is disposed within the passage of the chassis frame and at least a portion of the rod is threaded, and inserting the rod further into the passage includes screwing the rod into the captive nut.

J7. The method of any one of paragraphs J1-J6, wherein the rod has a knob at a distal end configured to support the support shelf when the support shelf is coupled to the rod.

J8. The method of any one of paragraphs J1-J7, wherein attaching the PSU to the support shelf includes fastening the PSU to the support shelf using threaded fasteners.

J9. The method of any one of paragraphs J1-J8, wherein a pair of protrusions extend from the side of the chassis frame, and the PSU is disposed between the protrusions when the PSU is sandwiched between the support shelf and the side of the chassis frame.

J10. The method of any one of paragraphs J1-J9, wherein the side of the chassis frame is a bottom surface of the chassis frame.

Advantages, Features, and Benefits

The different embodiments and examples of the computer chassis described herein provide several advantages over known solutions for organizing computer hardware and reducing cable-clutter on or around a desk or display. For example, illustrative embodiments and examples described herein provide a customizable, cost-effective device for organizing computer hardware, cables, and wiring while hiding them from view behind a display device.

Additionally, and among other benefits, illustrative embodiments and examples described herein allow a single computer chassis to be used with a variety of different display devices of different sizes.

Additionally, and among other benefits, illustrative embodiments and examples described herein allow a single computer chassis to be modified to mount a variety of hardware components based on, e.g., the size of a monitor on which it is mounted.

Additionally, and among other benefits, illustrative embodiments and examples described herein allow a single computer chassis to be used to mount power supplies of various sizes, including nonstandard sizes.

Additionally, and among other benefits, illustrative embodiments and examples described herein allow computing hardware, wires, cables, and attachments to be disposed entirely behind a display device, such that nothing is visible from the front of the display device (e.g., from the viewpoint of a user using the computer in a typical position).

Additionally, and among other benefits, illustrative embodiments and examples described herein allow usage of typically underutilized space behind a display device to organize and locate hardware components, including high-end, upgradeable hardware components.

Additionally, and among other benefits, illustrative embodiments and examples described herein increase useable lifespan of a desktop computer, by facilitating convenient servicing and replacement of components.

Additionally, and among other benefits, illustrative embodiments and examples described herein allow a motherboard and GPU to be spaced from each other in a computer chassis and connected by a riser cable or other suitable connector without sacrificing computing-hardware space in the chassis to accommodate the cable. Illustrative examples and embodiments described herein allow the riser cable to pass through a central portion of the chassis without interfering with the coupling of the central portion of the chassis to a support structure and display device. The flexibility in placing the cable, motherboard, and GPU facilitates placement of these components relative to the display in a manner that efficiently uses the space behind the display, allowing even physically large computing components to be hidden behind the display in convenient arrangements.

Additionally, and among other benefits, illustrative embodiments and examples described herein allow for reduced electronic waste (AKA e-waste) because individual computer components can easily be removed and replaced as desired. In contrast, known systems tend to make it difficult to remove and install individual components without changing other aspects of the computer setup. For example, in a conventional chassis it can be difficult to replace a given computer component with an upgraded version having a different form factor, because the conventional chassis is configured to accommodate only the form factor of the original component. Accordingly, to accommodate the upgraded component, it may be necessary to remove other components, to replace other components with differently dimensioned version, or to purchase a new chassis altogether (especially if the conventional chassis is part of an all-in-one computer). This waste is avoided by examples of the present teachings.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A chassis for a computer, the chassis comprising:
a chassis frame including a medial panel and first and second lateral frame portions extending from the medial panel, the first and second lateral frame portions each configured to support one or more computing components; and
a mounting hub having a first side configured to couple to a support structure and a second side configured to couple to a display device, and an opening configured to receive a lower portion of the medial panel of the chassis frame such that an underside of the medial panel is disposed at least partially within the opening;
wherein the medial panel of the chassis frame has a channel configured to receive a cable having a first end coupled to a component supported by the first lateral frame portion of the chassis frame and a second end coupled to a component supported by the second lateral frame portion of the chassis frame; and
wherein the medial panel of the chassis frame comprises a pair of panels disposed facing each other and defining the channel between them, and wherein portions of the first and second lateral frame portions of the chassis frame are sandwiched between the panels.

2. The chassis of claim 1, wherein the mounting hub comprises first and second plates disposed facing each other such that an inward-facing surface of the first plate is spaced from an inward-facing surface of the second plate, and the opening of the mounting hub is defined between the inward-facing surfaces; and wherein the first side of the mounting hub comprises an outward-facing surface of the first plate and the second side of the mounting hub comprises an outward-facing surface of the second plate.

3. The chassis of claim 2, wherein the mounting hub further comprises a support bridge disposed between the inward-facing surfaces, and the support bridge is configured to engage the underside of the medial panel when the lower portion of the medial panel is received in the opening of the mounting hub.

4. A chassis for supporting computer components behind a display device, the chassis comprising:
a frame including a central bracket comprising a pair of panels spaced from each other by a gap, and a pair of support arms each configured to couple to one or more computer components, wherein each of the support arms has a first end sandwiched between the panels; and
a mounting hub configured to couple to a display device, the mounting hub including a recess configured to receive at least a portion of the central bracket such that at least a portion of the gap is disposed within the recess.

5. The chassis of claim 4, wherein the mounting hub is further configured to couple the frame to a computer support device.

6. The chassis of claim 4, wherein at least one of the support arms is C-shaped and further includes a second end sandwiched between the panels of the central bracket.

7. The chassis of claim 4, wherein the first end of at least one of the support arms is pivotably coupled to the central bracket.

8. The chassis of claim 4, wherein the mounting hub includes a protrusion disposed within the recess and configured to engage the central bracket when the central bracket is received in the recess.

9. The chassis of claim 8, wherein the protrusion is disposed entirely within the recess.

10. The chassis of claim 8, wherein a lower edge of the central bracket comprises a groove and the protrusion is dimensioned to be received in the groove.

11. The chassis of claim 8, wherein the mounting hub comprises a pair of plates disposed facing each other such that the recess is defined between inward-facing surfaces of the plates, and the protrusion is disposed between the plates.

12. The chassis of claim 11, wherein an outward-facing surface of a second one of the plates is configured to couple to a computer support device.

13. A computer chassis comprising:
a mounting hub comprising a first plate and a second plate disposed facing each other such that a recess is defined between the first and second plates;
a support bridge disposed within the recess; and
a chassis frame configured to be removably received between the first and second plates such that the chassis frame sits on the support bridge;
wherein the chassis frame comprises a central panel, a first arm extending from a first lateral side of the central panel, and a second arm extending from a second lateral side of the central panel, the second lateral side being opposite the first lateral side;
wherein the first arm is pivotably coupled to the central panel such that the first arm is configured to pivot within a plane oriented parallel to the central panel; and
wherein the central panel comprises a first panel and a second panel disposed facing the first panel; and wherein the first and second arms each have respective first ends sandwiched between the first panel and the second panel such that the first and second panels are spaced from each other by the first ends of the first and second arms.

14. The computer chassis of claim 13, wherein the first arm further comprises a second end sandwiched between the first and second panels.

15. The computer chassis of claim 13, wherein the first and second panels define between them a channel having a first open end at the first lateral side of the central panel and a second open end at the second lateral side of the central panel.

16. The computer chassis of claim 13, wherein the first plate of the mounting hub is configured to be coupled to a support stand by one or more first fasteners each received in both the support stand and the first plate; and the second plate of the mounting hub is configured to be coupled to a display device by one or more second fasteners each received in both the display device and the second plate.

* * * * *